(12) United States Patent
Volfson

(10) Patent No.: US 12,276,446 B2
(45) Date of Patent: Apr. 15, 2025

(54) BEVERAGE CONTAINER WITH ON-BOARD SENSOR SUITE

(71) Applicant: Leo Volfson, Del Mar (CA)

(72) Inventor: Leo Volfson, Del Mar (CA)

(73) Assignee: Leo Volfson, Del Mar, CA (US)

( * ) Notice: Subject to any disclaimer, the term of this patent is extended or adjusted under 35 U.S.C. 154(b) by 0 days.

(21) Appl. No.: 18/245,638

(22) PCT Filed: Sep. 1, 2021

(86) PCT No.: PCT/US2021/048691
§ 371 (c)(1),
(2) Date: Mar. 16, 2023

(87) PCT Pub. No.: WO2022/060571
PCT Pub. Date: Mar. 24, 2022

(65) Prior Publication Data
US 2024/0011686 A1    Jan. 11, 2024

Related U.S. Application Data

(60) Provisional application No. 63/080,347, filed on Sep. 18, 2020.

(51) Int. Cl.
*F25B 49/00* (2006.01)
*A47G 19/22* (2006.01)
(Continued)

(52) U.S. Cl.
CPC .......... *F25B 49/00* (2013.01); *A47G 19/2227* (2013.01); *F25B 21/02* (2013.01);
(Continued)

(58) Field of Classification Search
CPC ...... F25B 49/00; F25B 21/02; F25B 2700/21; A47G 19/2227; A47G 2200/166; H02J 7/0042
See application file for complete search history.

(56) References Cited

U.S. PATENT DOCUMENTS 10,244,880 B2 *   4/2019  Mumford ............... F25D 31/008
2013/0259984 A1 * 10/2013 Eves .................. A47G 19/2255
                                                                362/101
(Continued)

FOREIGN PATENT DOCUMENTS

CN    110301793 A    * 10/2019
CN    209769914         12/2019
(Continued)

OTHER PUBLICATIONS

International Preliminary Report on Patentability in International Appln. No. PCT/US2021/048691, mailed on Mar. 21, 2023, 9 pages.

(Continued)

*Primary Examiner* — Curtis A Kuntz
*Assistant Examiner* — James E Munion
(74) *Attorney, Agent, or Firm* — Fish & Richardson P.C.

(57) ABSTRACT

A drinking vessel can include a liquid container that includes temperature controller and a temperature measurement device. The temperature measurement device can measure a temperature of a beverage within the liquid container. The temperature control device can control the temperature of the beverage within the liquid container to maintain the beverage at a desired temperature for consumption. The drinking vessel can also include a base that includes one or more of a power supply, electronics, a transceiver, input/output ports, a display, or charger. The base can couple to the liquid container via a mechanical and electrical interface.

23 Claims, 20 Drawing Sheets

(51) Int. Cl.
*F25B 21/02* (2006.01)
*H02J 7/00* (2006.01)
(52) U.S. Cl.
CPC .... *A47G 2200/166* (2013.01); *F25B 2700/21* (2013.01); *H02J 7/0042* (2013.01)

(56) References Cited

U.S. PATENT DOCUMENTS

2016/0150897 A1\* 6/2016 Zwarych ............ A47G 19/2227
                                                    177/25.13
2016/0286993 A1\* 10/2016 Pau ................... A47G 19/2288
2017/0325609 A1\* 11/2017 Bhoir ..................... F25B 21/04

FOREIGN PATENT DOCUMENTS

| CN | 110072448 B | \* | 4/2022 | ............. A47G 19/00 |
|----|-------------|----|--------|--------------------------|
| EP | 2225978 | | 9/2010 | |
| ES | 2957934 T3 | \* | 1/2024 | ........... A47G 19/027 |
| KR | 20160007150 A | \* | 1/2016 | |
| KR | 10-2018-0130965 | | 12/2018 | |

OTHER PUBLICATIONS

International Search Report and Written Opinion in International Appln. No. PCT/US2021/048691, mailed on Dec. 10, 2021, 11 pages.

\* cited by examiner

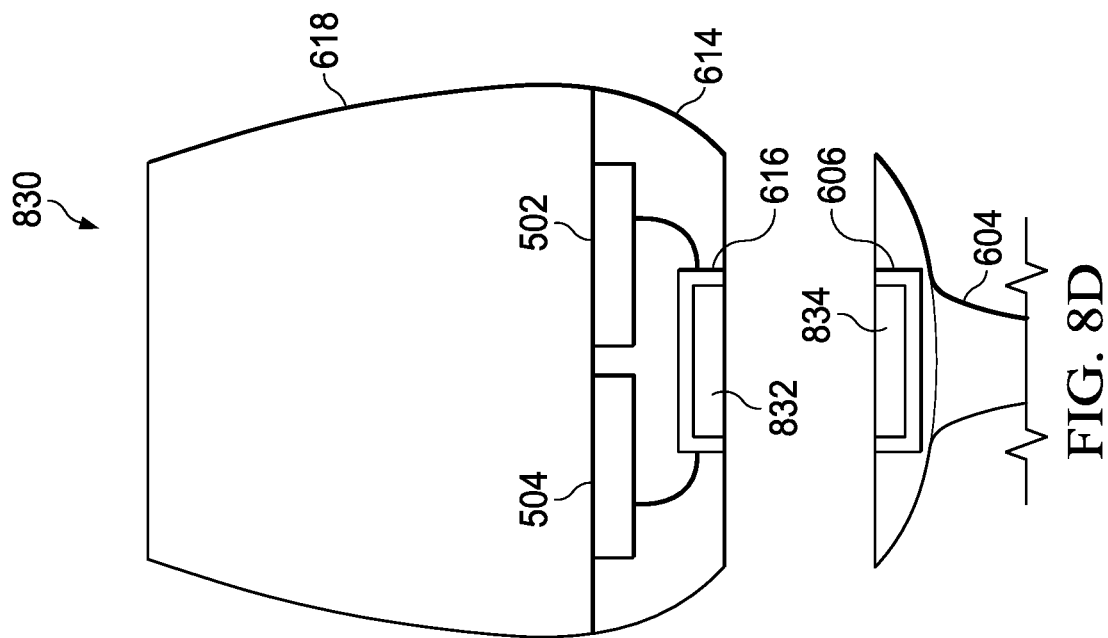
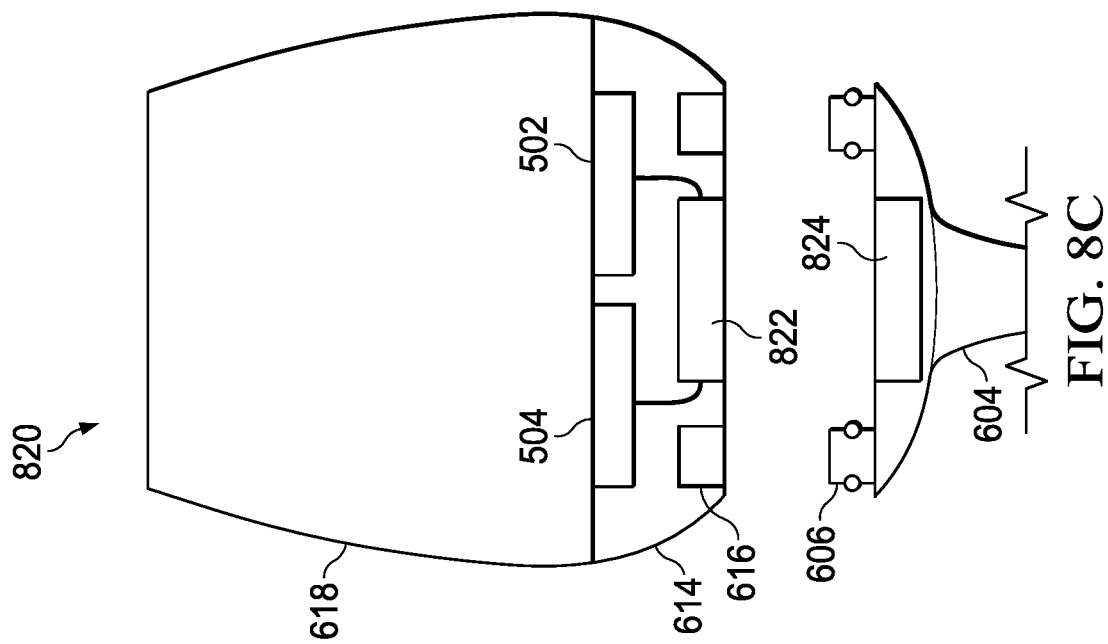

BEVERAGE CONTAINER WITH ON-BOARD SENSOR SUITE

REFERENCE TO RELATED APPLICATION

This application is a U.S. National Stage Application under 35 U.S.C. § 371 and claims the benefit of International Patent Application No. PCT/US2021/048691, filed Sep. 1, 2021, which claims the benefit of U.S. Provisional Patent Application No. 63/080,347, titled BEVERAGE CONTAINER WITH ON-BOARD SENSOR SUITE, filed on Sep. 18, 2020, the entire contents of which are incorporated by reference herein.

BACKGROUND

Beverages often are best enjoyed when at a certain temperature or within a temperature range. For example, certain wines, such as sparkling wines, taste best when consumed at a temperature between 38-45 degrees Fahrenheit, while certain red wines are best consumed at higher temperatures, such as between 55-60 degrees F. Other examples include different types of beers, liquors, juices, etc. that have ideal temperatures for consumption.

BRIEF DESCRIPTION OF THE DRAWINGS

FIGS. 8A-D are schematic block diagram illustrating logical elements and coupling mechanisms of example two-piece beverage containers that include an on-board sensor suite in accordance with embodiments of the present disclosure.

Figures are not drawn to scale. Like reference numerals refer to like parts throughout the various embodiments described in this disclosure.

DETAILED DESCRIPTION

Figure 1:
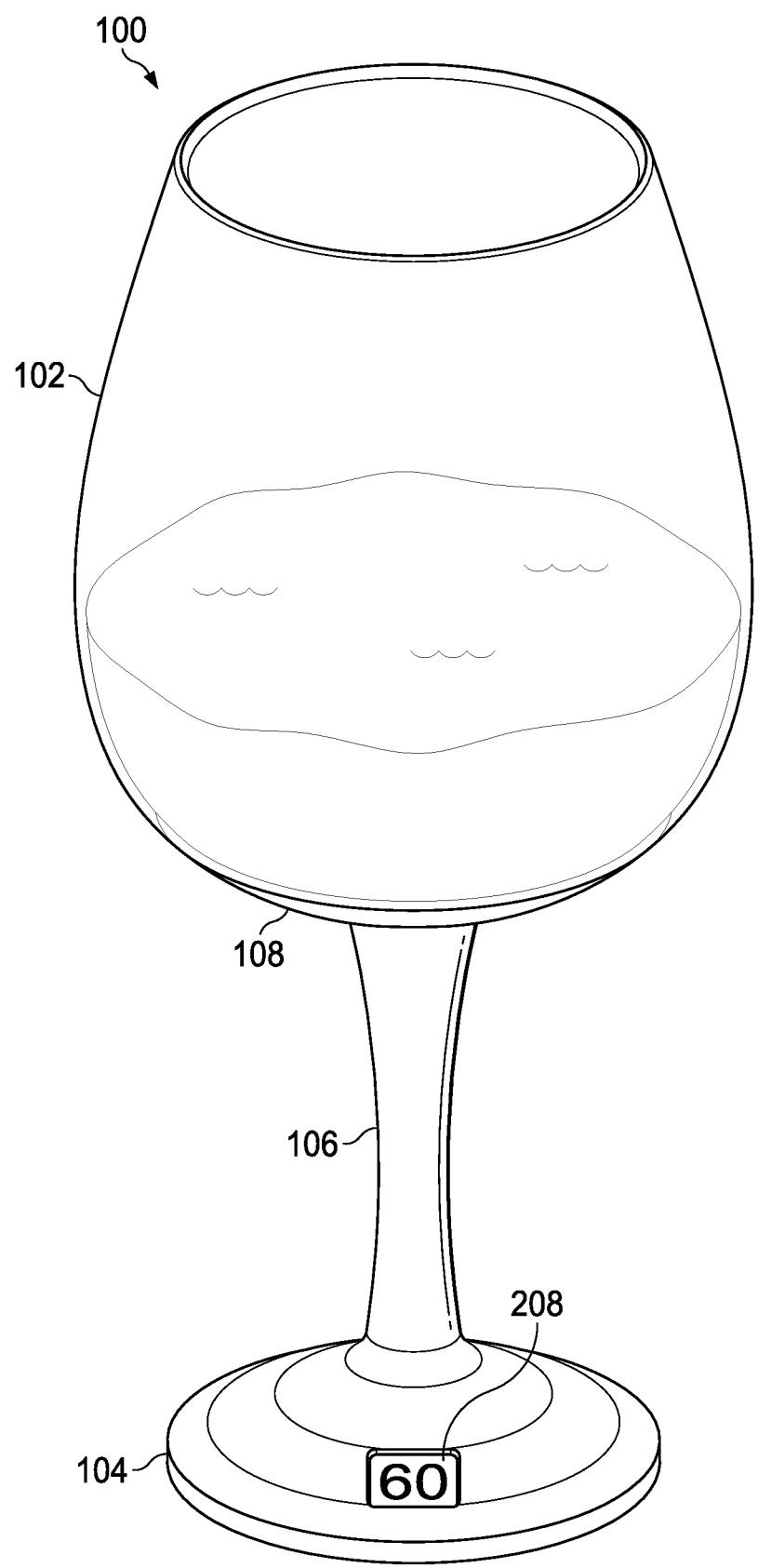
FIG. 1 is a schematic diagram of an example beverage container with an on-board sensor suite in accordance with embodiments of the present disclosure.

This disclosure describes devices and techniques to perform sensor analyses on liquids in a beverage container. Beverage containers can include one or more sensors that can perform various types of analyses on a liquid within the drinking vessel. Non-limiting examples include temperature measurements, Fourier Transform Infrared analyses, spectroscopic analyses, optical analyses, chemical analyses, etc. In some embodiments, the sensor analysis can include a temperature measurement of the liquid. Based on the temperature measurement, the liquid in the beverage container can be heated or cooled to a desired temperature. The temperature of the liquid can be adjusted so that the beverage reaches, and is maintained at, a predetermined temperature or within a predetermined temperature range. In embodiments, the temperature of the liquid can be maintained to be within the predetermined temperature range. For example, the temperature can be maintained within one or two degrees of the ideal temperature for drinking the liquid; or, if the temperature range is larger than one or two degrees, an average or median temperature within the extrema of the temperature range can be used as an ideal temperature.

After a beverage is poured into a drinking vessel, such as a glass or cup, the beverage temperature begins to change, depending on ambient conditions and other conditions. Certain beverages, such as wine, have properties that are enhanced when the beverage is at a certain temperature or is within a temperature range. For example, sparkling wine and light-bodied white wines have an optimal drinking temperature between 38 and 45 degrees F.; full-bodied whites, aromatic whites, and rosés are best enjoyed between 45 and 55 degrees F.; light-bodied reds and some medium bodied reds are best enjoyed at temperatures between 55 and 60 degrees F.; and some medium bodied reds, full bodied reds, and dessert wines are best at temperatures between 60 and 68 degrees F. These temperature ranges are for illustrative purposes only, and show that between the various types of wines, there are large temperature ranges. In fact, there are significant temperature swings even within individual types of wines.

This disclosure describes devices and methods to control the temperature of a beverage, such as wine, to maximize the enjoyment of the beverage to the last drop. This disclosure uses wine glasses as an example use case, but other types of drinking vessels or beverage containers are contemplated and are within the scope of this disclosure, as well as other types of beverages. For example, the beverage container can be a beer mug or stein, a whiskey or other liquor snifter, a cocktail glass, a martini glass, a champagne flute, a glass cup, a rocks glass, a margarita glass, a hurricane glass, etc.

In addition, the same or similar designs and features can be integrated into bottles without deviating from the scope of this disclosure. A wine bottle, for example, can be modified to include a sensor suite and the corresponding electronics for analyses, temperature control, and power. For example, a wine bottle can include a sensor that allows a person to determine the type of wine, wine quality, impurity level, age, and other factors without opening the bottle.

Figure 2:
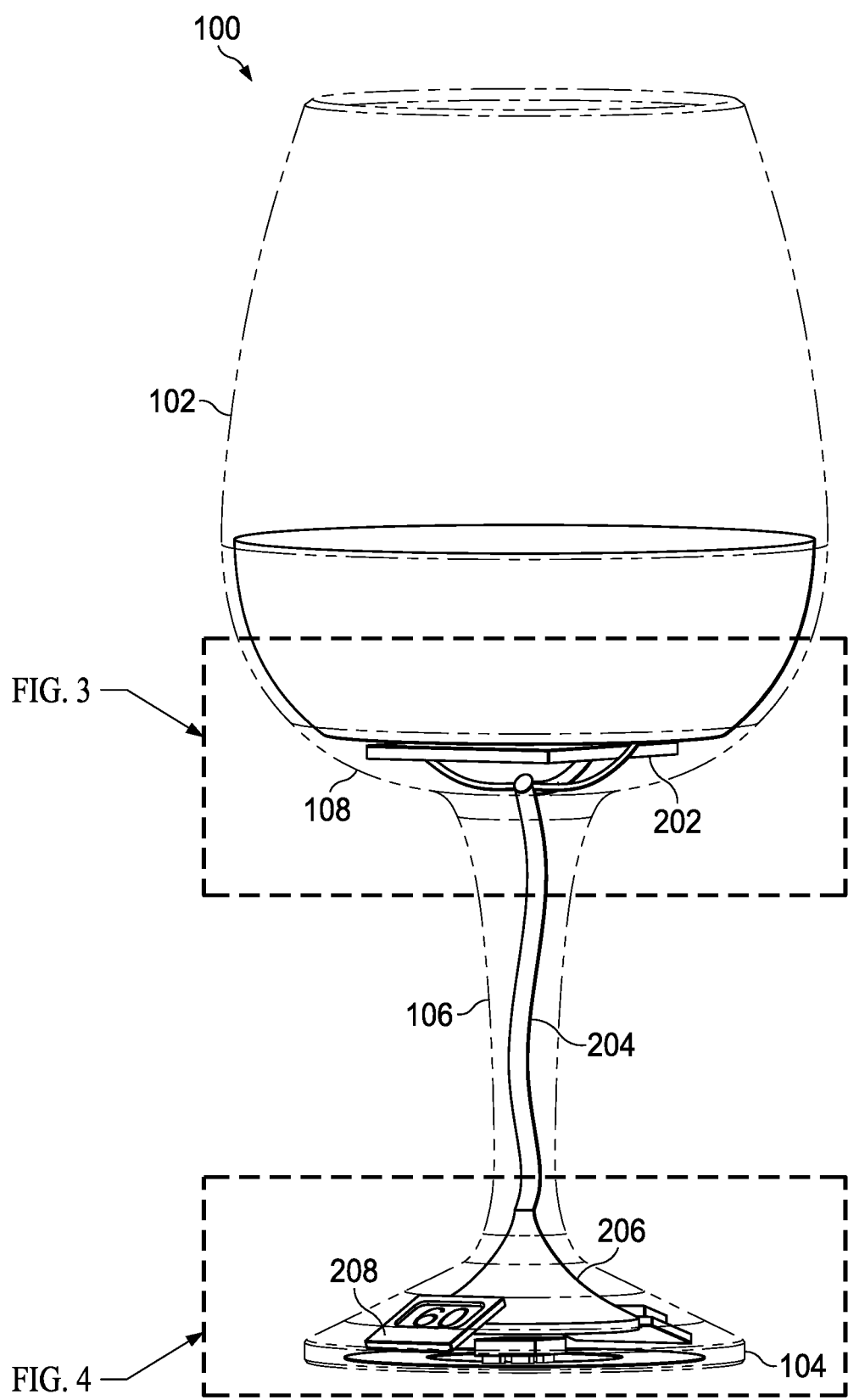
FIG. 2 is a schematic diagram illustrating certain electrical components of an example beverage container with an on-board sensor suite in accordance with embodiments of the present disclosure.
Figure 3:
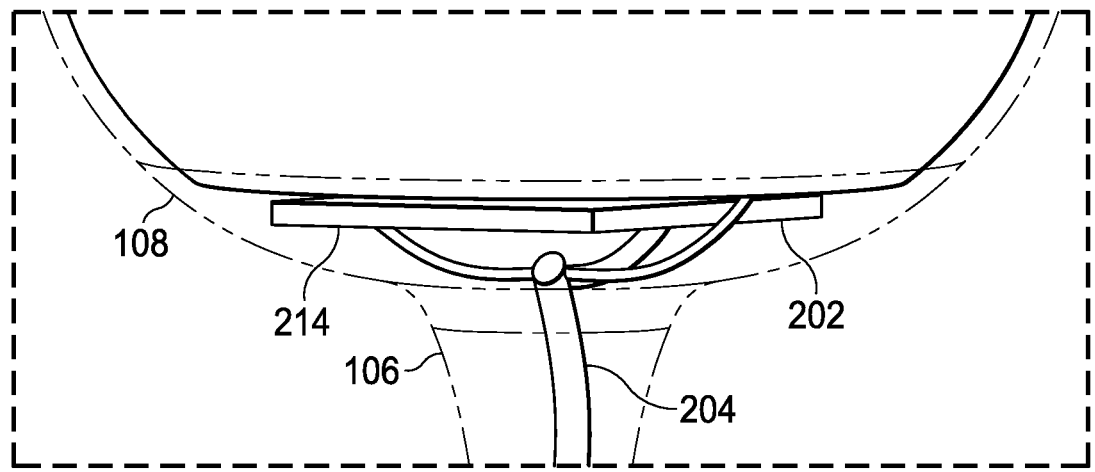
FIG. 3 is a schematic diagram of a close-up and transparent view of an example beverage container cradle illustrating example circuit components in accordance with embodiments of the present disclosure.
Figure 4:
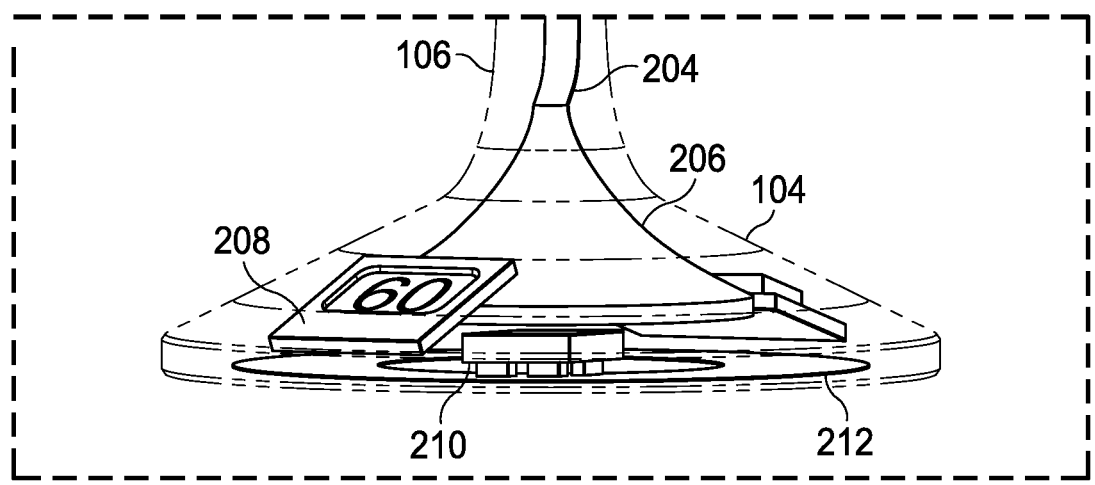
FIG. 4 is a schematic diagram of a close-up and transparent view of an example beverage container base illustrating example circuit components in accordance with embodiments of the present disclosure.

FIG. 1 is a schematic diagram of an example beverage container 100 with an on-board sensor suite in accordance with embodiments of the present disclosure. FIG. 2 is a schematic diagram illustrating certain electrical components of an example beverage container with an on-board sensor suite in accordance with embodiments of the present disclosure. FIG. 3 is a schematic diagram of a close-up and transparent view of an example beverage container cradle illustrating example circuit components in accordance with embodiments of the present disclosure. FIG. 4 is a schematic diagram of a close-up and transparent view of an example beverage container base illustrating example circuit components in accordance with embodiments of the present disclosure. FIGS. 1-4 can be discussed together. The beverage container 100 is illustrated as a wine glass for illustrative purposes, but as previously mentioned, other types of beverage containers are contemplated, as well as other types of beverages.

Beverage container 100 can be made from a combination of materials. For example, beverage container 100 can include a liquid container 102. Liquid container 102 can be glass, BPA-free plastic, crystal, metal, or other material suitable for holding a beverage and for permitting drinking of the beverage, and without leaking impurities into the beverage. The liquid container 102 can include a cradle 108. Cradle 108 can house a sensor suite 202. Sensor suite 202 can include one or more sensor devices, and in some embodiments, can include a temperature adjustment mechanism. The cradle 108 can support the liquid container 102 and can provide a mechanical and electrical interface to the stem 106 and/or base 104 (i.e., in some embodiments, a beverage container in accordance with embodiments of the present disclosure can include a cradle and a base, without the stem). In some embodiments, cradle 108 can house electrical components 214, which can include a temperature adjustment system (temperature controller, TEC, etc.). The cradle 108 can provide an interface between the liquid container 102 and the sensor, so that the sensor can measure or detect the temperature in the liquid container. The cradle 108 also provides an interface for the temperature adjustment system to change the temperature of the liquid in the liquid container 102.

The cradle 108 can be made of metal, plastic, glass, or other material that can support the liquid container 102, house electronic components, such as the sensor suite 202, and provide an interface for the base/stem. In embodiments, the cradle can insulate the stem 106 from heat or cold from the liquid container. For example, if the liquid container is to be maintained at 50 degrees F., a person's hand may increase the temperature of the liquid container. In addition, the coldness of the liquid container 102 might be uncomfortable for the person to hold the stem 106 if the coldness is felt by the person.

In some embodiments, the liquid container 102 can house the various electronic components, sensors, etc. without a cradle. For example, the sensors and temperature adjustment circuitry can be embedded within the material of the liquid container itself. Or the sensors and temperature adjustment circuitry can be housed within a double-walled construction of the liquid container. Other configurations are also possible without deviating from the scope of the disclosure.

In some embodiments, the structure of the liquid container 102 can be "double-walled." For example, the outer surface of the liquid container 102 can be isolated from the inner wall of the liquid container using air or other insulating materials, to insulate the outer wall from the temperature of the liquid contacting the inner wall. In some embodiments, a beverage container can be designed without a stem. In such cases, the double-walled design can help maintain the temperature of the liquid in the liquid container while also ensuring comfort for the person.

The beverage container 100 can also include a base 104. Base 104 can be any material that is rigid enough to support the liquid container 102 and cradle 108, e.g., without spilling the beverage. The base 104 can house various electronic elements, such as battery 206 and display 208. Other elements can also be housed in the base 104, which are described later in this document.

In some embodiments, the beverage container 100 can include a stem 106. Stem 106 can add elegance to the beverage container 100. As with other wine glasses, the stem 106 can act as a handle preventing heat from a drinker's hand from affecting the temperature of the beverage. The stem 106 can also house wires 204, electronic components, flex circuitry, or other components, that link the electrical components in the base 104 with electrical components 202 in the cradle 108. The base 104 and the stem 106 can be a single piece or can be multiple pieces that are connected together. The base 104 and stem 106 can be interchanged for different base-and-stem combinations, to provide different sensor capabilities, heating and cooling capabilities, charging capabilities, battery life, etc.

The cradle 108 can also house other electronic components to the extent that a separate base (or base+stem) is not used, such as in a high-ball glass. For example, the cradle 108 can house the power supply, microelectronics, processors, display, memory, input/output (I/O), wireless receiver, charging interface, etc. In some embodiments, base 104 and cradle 108 can be a single unit. For example, in a high-ball glass or rocks glass, where the liquid container is supported by a base without a stem, the cradle/base can house the sensor suite and can house the electronic components. Other variations can also be used, depending on the style of beverage container without deviating from the scope of this disclosure.

FIG. 4 also illustrates electronic circuitry 210 coupled to a printed circuit board (PCB) 212. Electronic circuitry 210 can include a microcontroller, processor, memory, and/or other electronic circuitry. The electronic circuitry 210 can be interconnected using a PCB 212. Other circuit packaging besides a PCB can also be used.

Various of the electronic components can be interconnected through the PCB 212. For example, battery 206 can provide power to various components through the PCB, including the display 208 and the electronic circuitry 210. Battery 206 can be independently connected to the electrical components 214, including the temperature adjustment system via wires 204.

Figure 5:
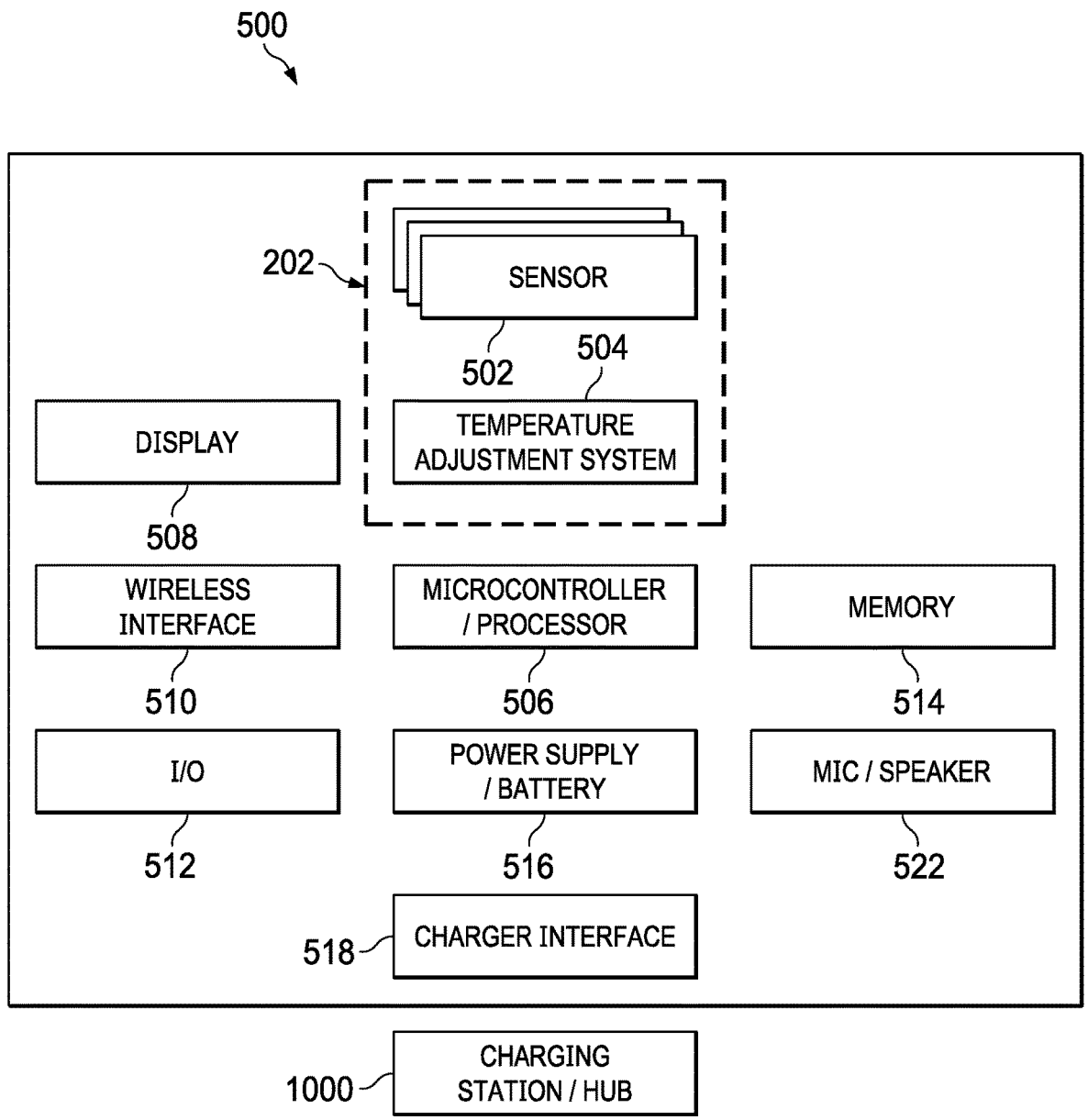
FIG. 5 is a schematic block diagram illustrating example logical components for a beverage container that has an on-board sensor suite in accordance with embodiments of the present disclosure.

FIG. 5 is a schematic block diagram illustrating example logical components for a beverage container that has an on-board sensor suite in accordance with embodiments of the present disclosure. The sensor suite 202 can include one or more sensors 502. Sensor(s) 502 can include temperature sensors, Fourier Transform Infrared sensor (FTIR) devices, smell sensors, ultraviolet/visible light sensors, spectroscopic sensors, LED-based sensors (LED and detector), laser-based sensors (laser and detector), chemical sensors, Raman sensors, Rayleigh sensors, etc. Other sensor(s) 502 can include accelerometers, inclinometers, weight scales, or other physical-metric sensors.

These sensor(s) 502 allow the beverage container to make a determination or pass the information wirelessly concerning the contents of the glass or amount in the glass. For instance, in the restaurant scenarios the beverage container could signal the server that the beverage container glass is empty or nearing empty, and more beverage is needed.

Orientation devices, such as accelerometers and inclinometers, can detect when user is drinking, i.e. tipping the glass. Or swilling the liquid in the glass. Depending on those reading, the operation of the glass will be adjusted. The sensor(s) 502 can analyze the legs of the wine, for example, after the wine has been swilled.

One of the implementations of inclinometers: inclinometers can be embed into two glasses to allow "competitive" drinking: when glasses are picked up the time starts and when they are upside down the time stops showing "who wins the contest."

The sensor(s) 502 can be used to measure a variety of characteristics of the liquid. For example, sensor(s) 502 can measure temperature, acidity, astringency, sugar content, color, chemical composition (presence or amount of impurities, tannins, sulfides, etc.), ingredient composition, and other characteristics. For wines, by way of example, a sensor suite 202 can provide information about whether the wine has gone bad or not, whether the wine is correctly labelled, identify the grape varietals in the wine, the region the wine comes from, impurities in the wine, the nose or bouquet, the body, the salinity, transparency, or other characteristics.

In some embodiments, the sensor can measure alcohol contents in the beverage, and also in saliva from the drinker.

For temperature control, sensor 502 can include temperature sensor that measures the temperature of either the liquid container or the liquid within the container (or both). The sensor 502 can communicate the temperature information directly to a temperature adjustment system 504. The temperature adjustment system 504 can adjust the temperature of the liquid container or the liquid depending on what the liquid is and what the optimal temperature should be for the liquid. The temperature adjustment system 504 can have circuitry and logical elements to receive the temperature information and determine whether to heat or cool the liquid and to what temperature. The temperature adjustment system 504 can then begin heating or cooling, while continuously receiving updated temperature information from the sensor 502. The temperature adjustment system 504 can then maintain the temperature by continuously monitoring the temperature information provided by the sensor.

In some embodiments, the sensor 502 provides the temperature information to a microcontroller/processor 506. The processor 506 can be a hardware processor, ASIC, FPGA, microcontroller, CPU with firmware, or other type of processing hardware. The processor 506 can receive the sensor information and determine whether to heat or cool the liquid or liquid container. A memory 514 can store beverage information as well as beverage temperature information. Beverage information can include the type of beverage, the brand, the name, the vintage, the grape, the varietal, the age, etc. The memory 514 can also store a temperature or temperature range for the beverage. Beverage temperature information can also include other types of information, such as the rate cooling or heating should take place. All the information can be stored locally in memory 514. In some embodiments, the microcontroller can prompt a drinker to provide the information at some time prior, which the drinker can do through a mobile app, voice command, database synchronization, website, or other interface.

The microcontroller/processor 506 can be used to process other types of sensor data. For example, the microcontroller/processor 506 can be programmed to process raw sensor data and provide information based on the raw data. For example, a color analysis may result in a spectrum of wavelengths present in the beverage. The processor 506 can identify colors from the spectrum and their respective amplitudes, associate those colors with known information about the beverage, and provide information about whether the colors are expected for that beverage, whether they deviate, etc.

Memory 514 can be a solid-state memory, a cache memory, a nonvolatile memory, RAM, removable SD card, internal flash memory, etc. Any type of memory or electronic data storage device can be used without deviating from the scope of the disclosure.

Temperature adjustment system 504 can include a thermoelectric cooler (TEC), a thermoelectric Peltier cooling device, a thermoelectric generator (electrical to thermal), or other type of controllable temperature adjustment device. A temperature adjustment system 504 can include a heat transfer element that operates based on applied electricity (e.g., applied current). The heating/cooling effects can be controlled by changing the polarity of the applied current. The temperature adjustment system 504 can include a single TEC device or multiple TEC devices. The TEC devices can be flexible and form fitting. The TEC devices can be constructed into different shapes and sizes. The TEC devices can be stacked to increase cooling or heating rates magnitudes. The temperature adjustment system 504 can control the temperature of the liquid container that holds the liquid (e.g., liquid holder 618) or the temperature adjustment system 504 can control the temperature of the liquid within the liquid container (or some combination of the two).

The beverage container 100 can include a display 508. The display can be a light emitting diode, liquid crystal, or other type of display. The display 508 can display temperature information of the beverage in real time. The display can also provide other information, such as other information about the beverage from the sensor suite 502. The display can, in some embodiments, provide alerts, such as warnings about inebriation, quality of the beverage, impurities, etc. In embodiments, the display can provide text alerts, alarms, phone alerts, or other information from a wireless source or from an internal source (microcontroller, temperature sensor, etc.).

The beverage container can also include a wireless interface 510. Wireless interface 510 can include a cellular radio, Wi-Fi transceiver, Bluetooth transceiver, radio-frequency transceiver, or voice command interface, other type of wireless interface (or a combination of different types of wireless transceivers). The wireless interface 510 can be used to program the microcontroller 506, upload and download information to/from memory 514, receive information from sensor(s) 502, control the temperature adjustment system 504, receive power or charge information, diagnose and fix bugs or errors in software or firmware, switch the power on or off, and other functions. The wireless interface 510 can also communicate with other beverage containers 100. The beverage containers can wirelessly (or wired, if several are connected) communicate with each other or via a hub or charging station to transmit and receive information pertaining to the liquid or any other operation of the glass.

The wireless interface 510 can also include an RF interface for charging or data exchange.

The beverage container 100 can also include a wired input/output (I/O) interface. The I/O can be used to charge the battery/power supply 516, provide power to the power supply 516, program the microcontroller/processor 506, write to or read from memory 514, retrieve information from the sensor(s) 502, calibrate the sensor(s) 502, calibrate the temperature adjustment system 504, provide a control interface, diagnose and repair bugs or other errors in software or firmware, download logs, upload data, etc.

The beverage container 100 can include a power supply/battery 516. The power supply/battery can be a rechargeable type of battery that delivers the correct voltage and/or current to the various electrical components, including the sensor(s) 502 and the temperature adjustment system 504. The power supply/battery 516 can be recharged by the I/O 512. In some embodiments, the battery 516 can be charged wirelessly by a charging interface 518 that interfaces with a charging station/hub 1000 (e.g., an example includes a QI type charger or inductive, wireless charging). The charging station/hub 1000 is described in more detail later in this disclosure.

The beverage container 100 can include an audio input/output (microphone/speaker) 522. The audio I/O can be used to receive voice commands, such as natural language voice inputs about what the beverage is and/or what the temperature should be. The audio I/O can provide feedback about what the temperature is or should be and whether the beverage has reached the desired temperature.

Figure 6:
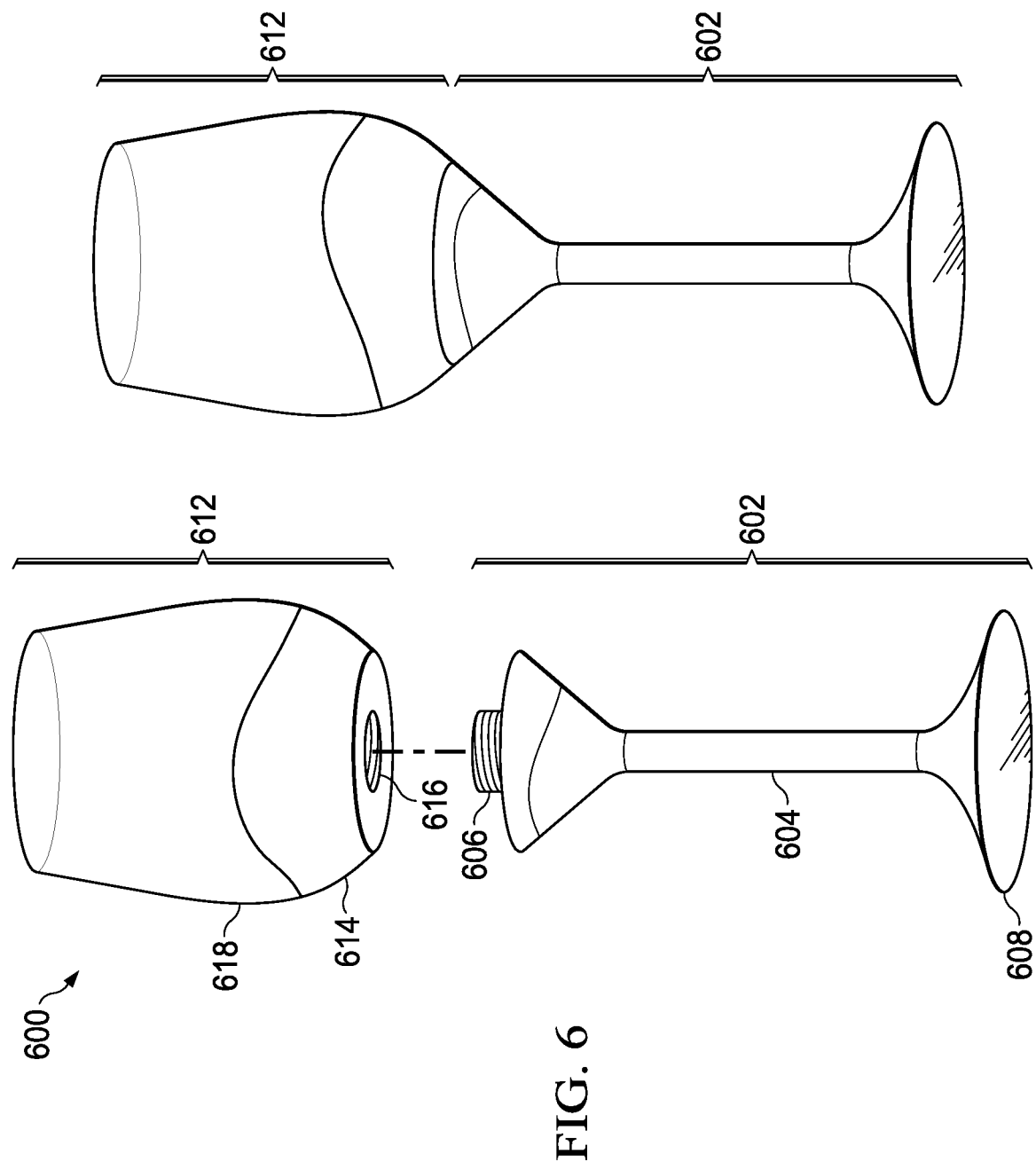
FIG. 6 are schematic diagrams illustrating an example two-piece beverage container that includes a detachable cradle and base and a physical and electrical interface for coupling the cradle to the base in accordance with embodiments of the present disclosure.

FIG. 6 are schematic diagrams illustrating an example two-piece beverage container that includes a detachable cradle and base and a physical and electrical interface for coupling the cradle to the base in accordance with embodiments of the present disclosure. In some embodiments, the beverage container can include two portions: a base portion 602 and a cradle portion 612. The base portion 602 shown in FIG. 6 includes a base 608 and a stem 604. The base 608 can house a battery, microcontroller, display, memory, wired and wireless I/O, audio I/O, etc. The stem 604 can house conductors that electrically connect the electronics in the base 608 with electronics in the cradle 614.

The cradle portion 612 can include a cradle 614 and a liquid holder 618. The cradle can support the liquid holder 618 and can house the sensor suite and temperature adjustment system, etc. The stem 604 can include a physical and electrical interface 606 that couples the base portion 602 with a physical and electrical interface 616 the cradle portion 612. Non-limiting examples of how the base portion 602 and the cradle portion 612 can interface are described in more detail in FIGS. 8A-D.

Figure 7:
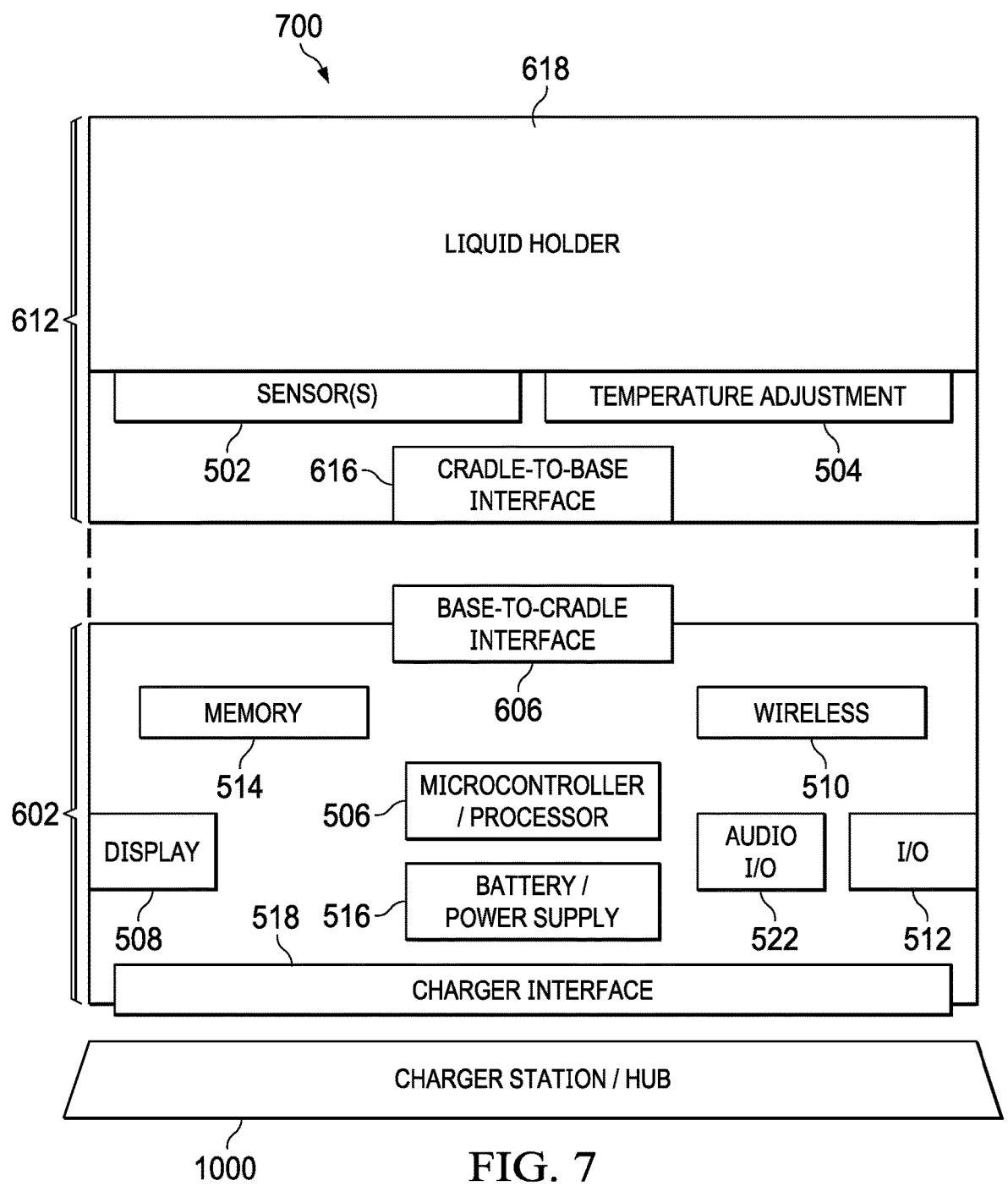
FIG. 7 is a schematic block diagram illustrating logical elements of an example two-piece beverage container that includes an on-board sensor suite in accordance with embodiments of the present disclosure.

FIG. 7 is a schematic block diagram illustrating logical elements of an example two-piece beverage container that includes temperature adjustment mechanisms in accordance with embodiments of the present disclosure. FIG. 7 provides a similar logical diagram as shown in FIG. 5. In FIG. 7, example logical locations of various electronic components are shown. For example, the microcontroller/processor 506, memory 514, battery/power supply 516, charger interface 518, wireless interface, wired I/O, audio I/O, and display 508 are housed in the base portion 602. The sensor suite 502 and temperature adjustment system 504 are housed in the cradle portion 612.

The charging station/hub 1000 is also shown to be logically proximate the charger interface 518.

The cradle portion 612 can rigidly and electrically couple to the base portion 602 by cradle-to-base interface 616 and the base-to-cradle interface 606.

Figure 8B:
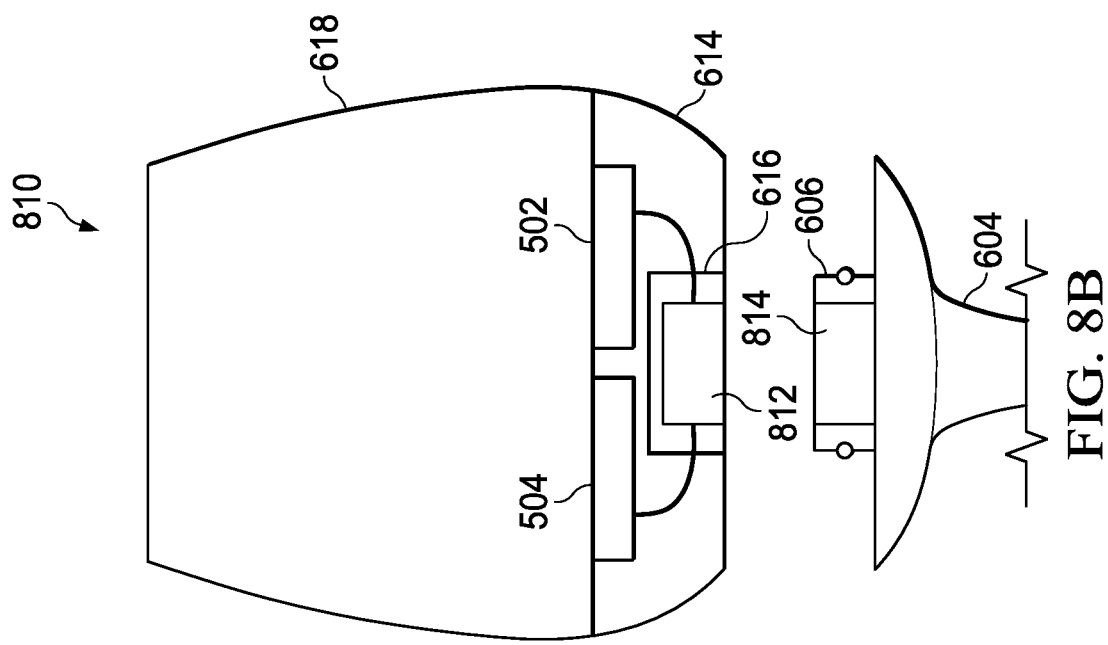
Figure 8A:
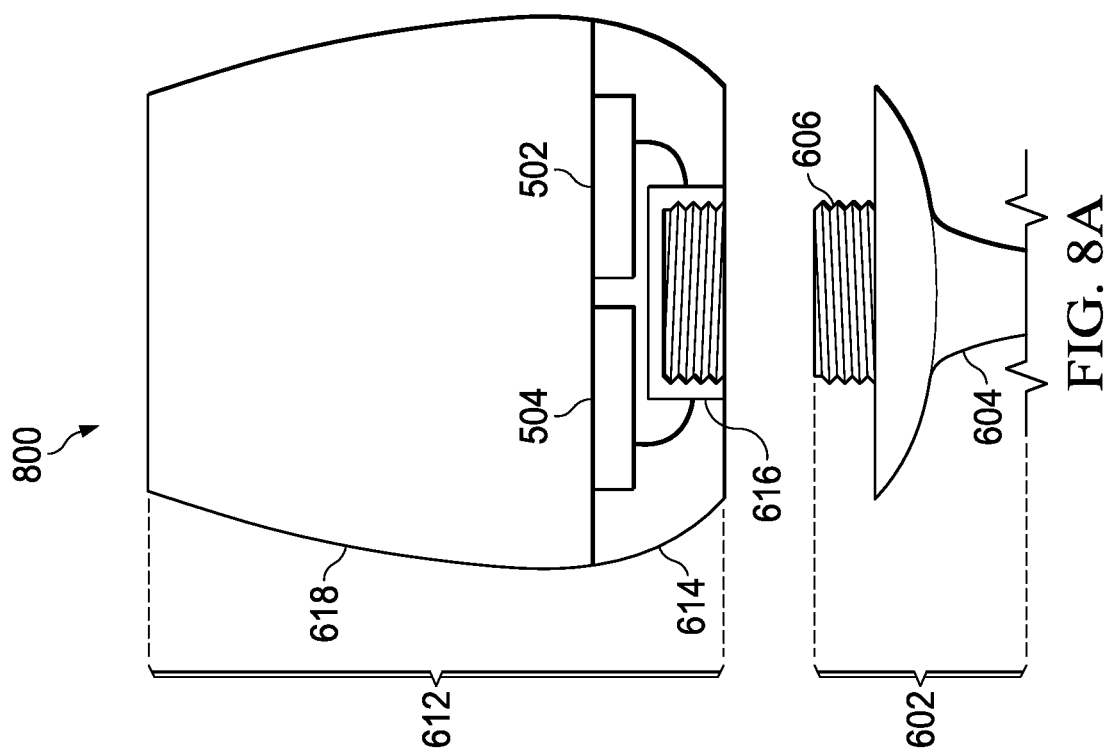

FIGS. 8A-D are schematic block diagram illustrating logical elements and coupling mechanisms of example two-piece beverage containers that include an on-board sensor suite in accordance with embodiments of the present disclosure. FIG. 8A illustrates a first example 800, wherein the cradle-to-base interface 616 and the base-to-cradle interface 606 use a threaded interface to screw the cradle portion 612 onto the base portion 602. FIG. 8B illustrates another example embodiment of how a two-piece system can interface. The interface in FIG. 8B is a friction-fit interface that can use a tight tolerance fit between the cradle-to-base interface 616 and the base-to-cradle interface 606. An O-ring or other type of seal can also be used to help secure the two pieces together. Electrical interfaces 812 and 814 can reside within the mechanical interface, but can be elsewhere without deviating from the scope of the disclosure. For example, concentric rings around the physical interface can be used as electrodes or as inductive connections.

In the embodiment 820 of FIG. 8C, the (friction fit) cradle-to-base interface 616 and the base-to-cradle interface 606 are not in the center, but around the sides of the cradle portion 612 and base portion 602, respectively. In FIG. 8C, the electrical connections 822 and 824 can be centered. These electrical connections 822 and 824 can be electrodes, inductive/wireless charging pads, etc.

In the embodiment 830 of FIG. 8D, the cradle-to-base interface 616 and the base-to-cradle interface 606 use magnetic elements 832 and 834 to couple the base portion 602 with the cradle portion 612. The electrical interface can be similar to those describe above.

Notably, the electrodes or RF pads can transfer power but can also transfer information between the sensor suite, temperature adjustment system, and the supportive electronics (microcontroller, display, memory, etc.).

Figure 9:
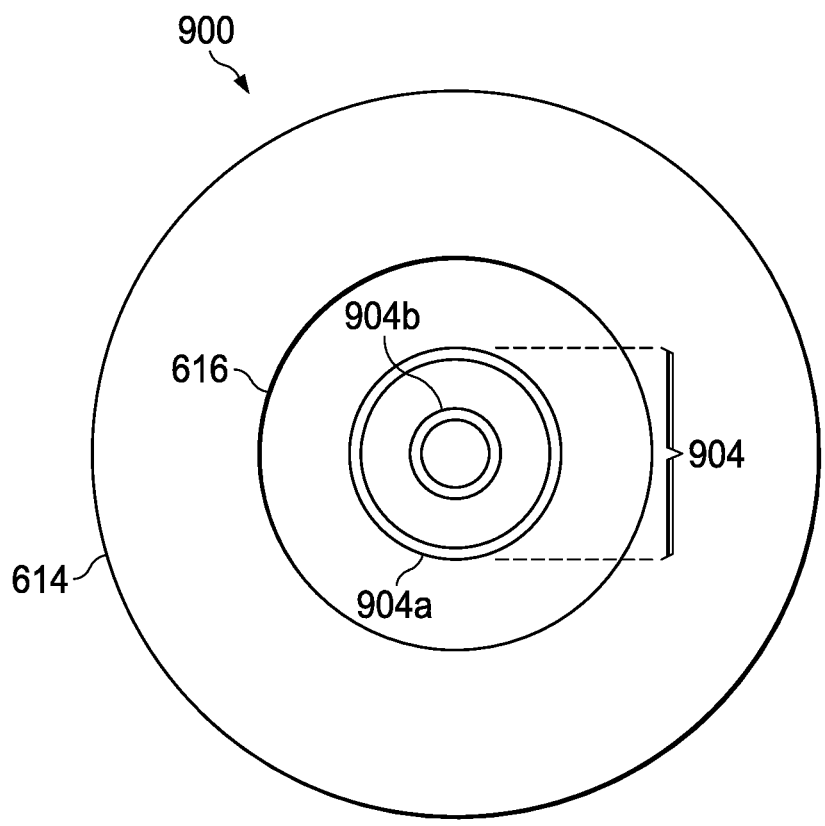
FIG. 9 are schematic diagrams illustrating electrical interfaces between a detachable cradle and base of a beverage container with temperature control mechanisms in accordance with embodiments of the present disclosure.
Figure 9:
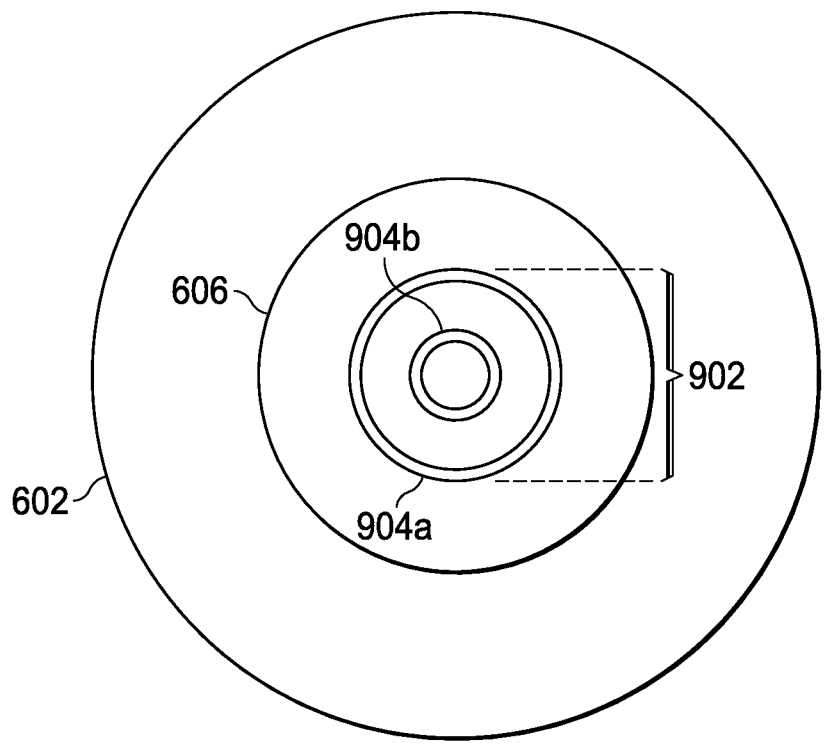

FIG. 9 is a schematic diagram 900 illustrating electrical interfaces on a cradle 616 and a base portion 602 of a beverage container with temperature control mechanisms in accordance with embodiments of the present disclosure. The cradle-to-base interface 616 can include a coaxial electrode 904*a*/904*b* (showing signal and return electrodes) that complete the electrical circuit with coaxial electrode 914*a*/914*b* (showing signal and return electrodes) in the cradle portion 616 and electrical components in the base portion 602 when the cradle-to-base interface 616 is screwed into the base-to-cradle interface 606. Likewise, the base-to-cradle interface 606 can also include electrodes that can contact the electrodes in the cradle-to-base interface 616. Therefore, when properly screwed together, the electrodes create a completed circuit.

In some embodiments, the electrical communication can be done through an RF interface, such as those similar to inductive wireless chargers.

Figure 10A:
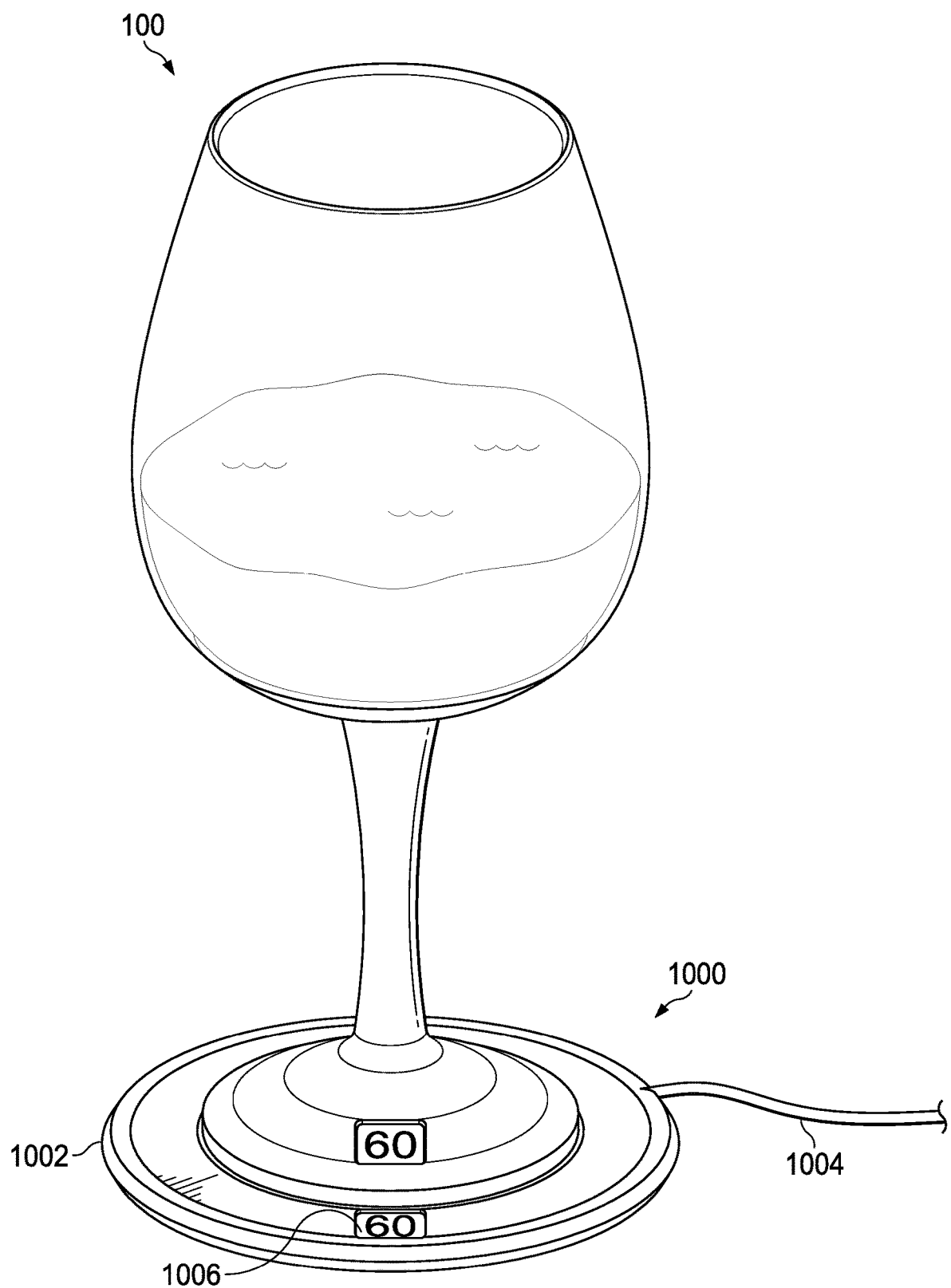
FIG. 10A is a schematic diagram illustrating an example charging station for a beverage container with an on-board sensor suite in accordance with embodiments of the present disclosure.
Figure 10B:
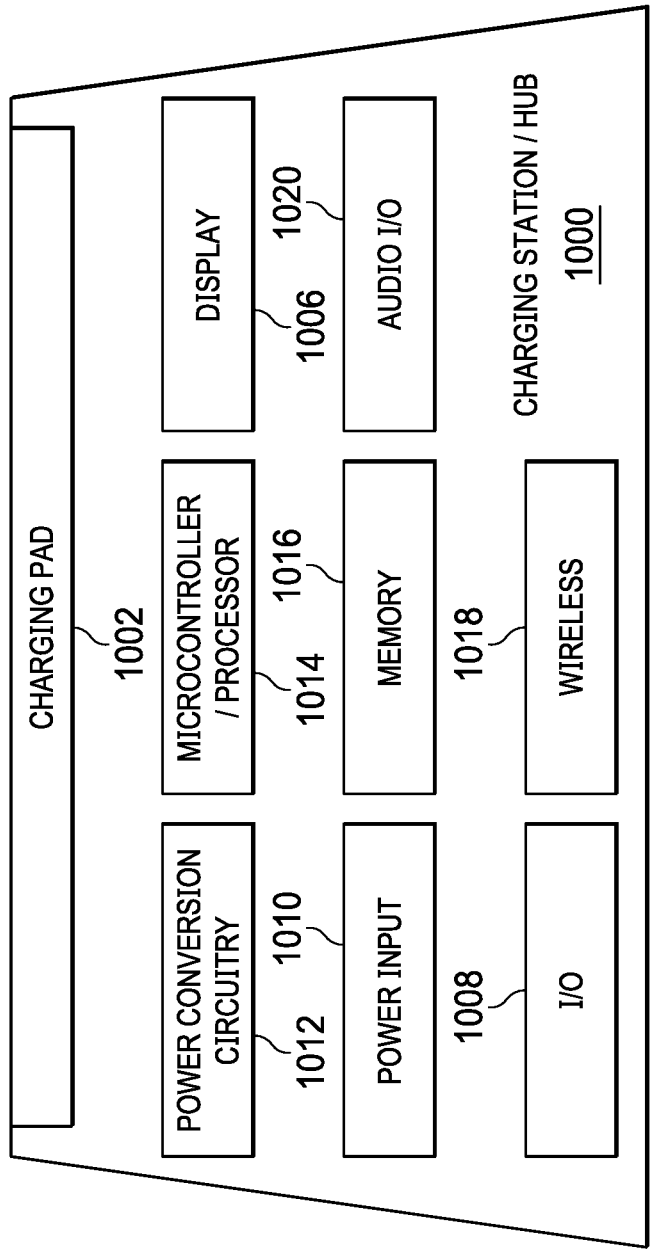
FIG. 10B is a schematic diagram illustrating example logical elements for a charging station in accordance with embodiments of the present disclosure.

FIG. 10A is a schematic diagram illustrating an example charging station/hub 1000 for a beverage container with temperature control mechanisms in accordance with embodiments of the present disclosure. FIG. 10B is a schematic diagram illustrating example logical elements for a charging station/hub 1000 in accordance with embodiments of the present disclosure. The charging station/hub 1000 can include a charging pad 1002 that provides an interface that electrically couples to a charging interface 518 in the base of the beverage container 100. The charging pad 1002 can facilitate electrical conduction or wireless charging. The charging station/hub 1000 can include a display 1006 that provides the same information as the display 508. The display 1006 can provide different information, based on implementation choices, such as the amount of charge in the battery 516 or other information. The charging station/hub 1000 can include a wired I/O, such as a dedicated charging wire or USB/thunderbolt cable (generally shown at 1004) that connects to an I/O port 1008.

The charging station/hub 1000 can include other electronic components. For example, the charging station/hub 1000 can include an I/O port 1008. I/O port 1008 can be used for charging purposes, programming purposes, downloading and uploading information, etc.

The charging station/hub 1000 can include a power input 1010 for a dedicated power cord. The charging station/hub 1000 can include power conversion circuitry 1012 for converting received power into the correct voltages, current, or RF signal for wireless charging.

The charging station/hub 1000 can also include a microcontroller/processor 1014, a memory 1016, wireless interface 1018, and audio I/O 1020. The audio I/O 1020 can be used for voice commands and audible outputs. The microcontroller/processor 1014 can process instructions and provide information, either from memory or information received from remote sources or from the beverage container 100. The wireless interface 1018 can be used for wireless communications, such as Wi-Fi, cellular, Bluetooth, or other types of wireless communications. The charger station/hub 1000 (and the beverage container 100) can support natural language services and AI, such as Siri or Alexa, etc.

Figure 11:
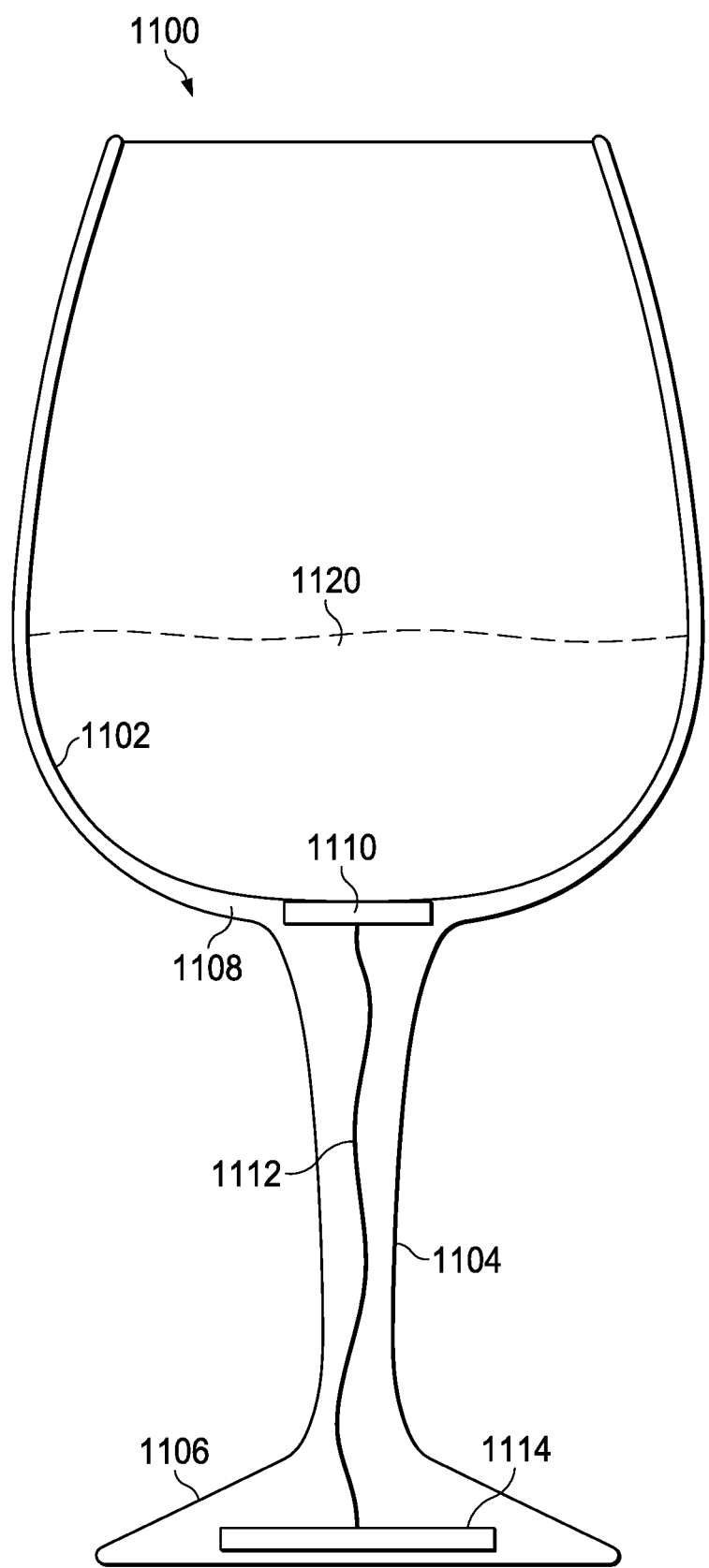
FIG. 11 is a schematic diagram of a one-piece beverage container that includes an on-board sensor suite in accordance with embodiments of the present disclosure.

FIG. 11 is a schematic diagram of a one-piece beverage container that includes an integrated temperature adjustment mechanism in accordance with embodiments of the present disclosure. In some embodiments, the beverage container 1100 can be a single piece, as opposed to a two-piece construction. In the single-piece construction, all of the electronics are embedded within the beverage container. The electrical components and functionality would the same or similar as the two-piece construction. In the one-piece construction, the cradle and base could be the same part of the beverage container, such as for whiskey glasses, rocks glasses, high-ball glasses, etc., where a stem is not used.

In the example embodiment shown in FIG. 11, the beverage container 1100 includes a liquid container portion 1120 that has an outer wall 1102 that interfaces with the liquid (contacts the liquid). The beverage container 1100 also has an inner portion 1108 within which the electrical components are housed or embedded. The electrical components are the same or similar as the two-piece design, and can include a sensor suite 1110, wiring 1112 (through stem 1112), and supportive electronics 1114 (such as power, displays, processors, memory, wireless I/O, wired I/O, audio I/O, etc.). The supportive electronics 1114 of beverage container 1100 are in the base 1106, but it is understood that the supportive electronics can be located elsewhere without deviating from the scope of this disclosure.

Figure 12:
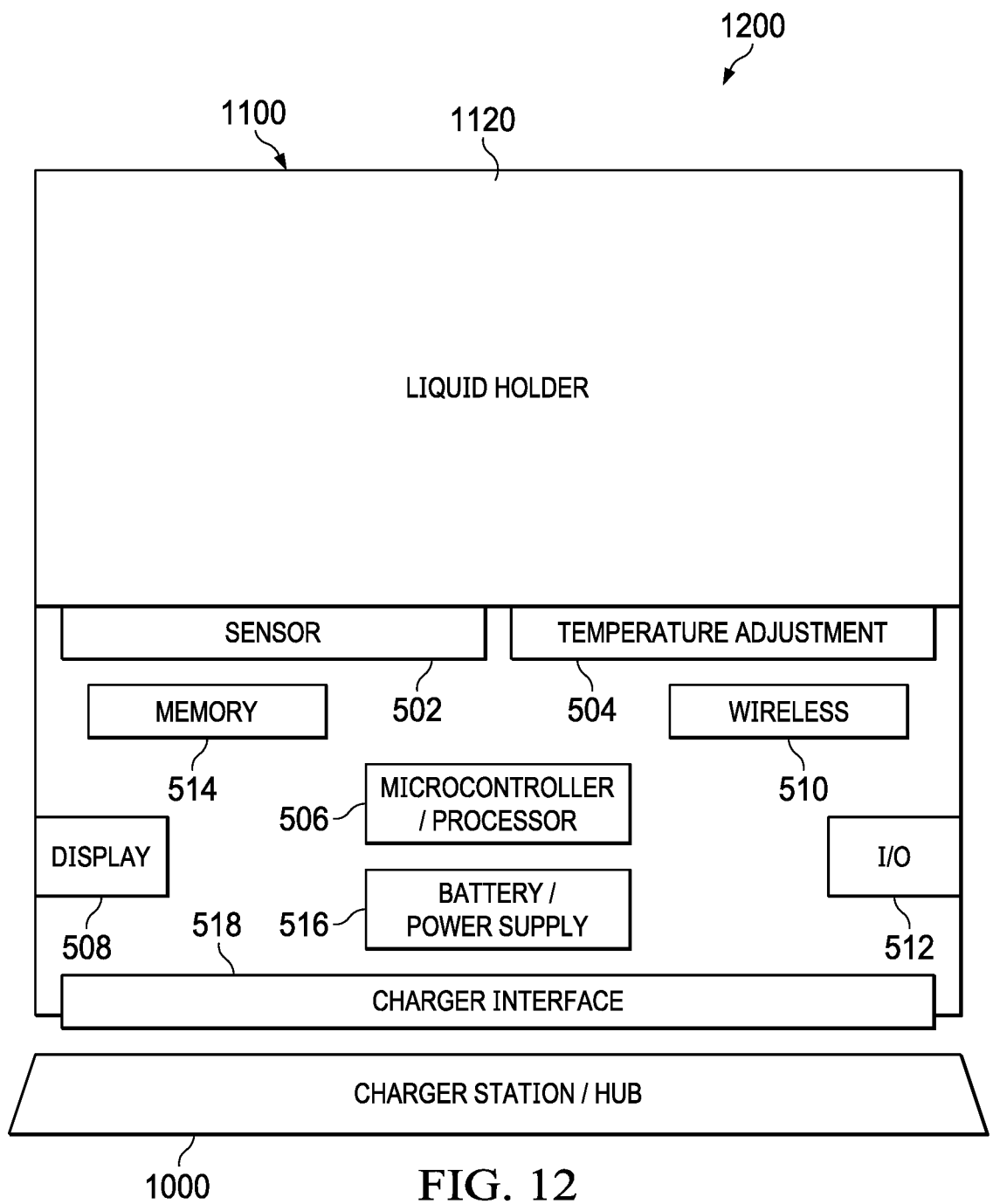
FIG. 12 is a schematic diagram illustrating logical elements of a one-piece beverage container in accordance with embodiments of the present disclosure.

FIG. 12 is a schematic diagram illustrating logical elements of a one-piece beverage container in accordance with embodiments of the present disclosure. Logical construction 1200 of the beverage container 1100 includes the same or similar features as shown in FIG. 5, but without the interface between a separate cradle portion and base portion. The one-piece beverage container can include some or all of the various electronics as shown in the configuration of FIG. 5. For example, the beverage container 1100 can include a sensor suite 502 that includes one or more types of sensors. The beverage container 1100 can include a temperature adjustment system 504 to control the temperature of a liquid in the beverage container. The beverage container 1100 can include a double walled construction or other form of insulated construction. The insulation prevents heat transfer between a drinker's hand and the liquid within the liquid container 1120. The construction of the beverage container 1100 can also provide a housing for the various electronic components, such as the sensor 502 and temperature adjustment circuitry 504.

The beverage container 1100 can include a base that houses other electronic components, such as microcontroller/processor 506, display 508, wireless transceiver 510, I/O 512, memory 514, battery 516, and charger/interface 518.

The charger/interface 518 can electronically and/or physically couple to a charging station/hub 1000. Charging station/hub 1000 can provide power to the beverage container 1100 through the charger/interface 518, and/or control signals to the beverage container 1100 through the charger/interface 518 such as temperature control information, handshake signals, liquid type, or other information. The charging station/hub 1000 can also receive information from the beverage container 1100 through charger/interface 518, such as the current temperature of the beverage in liquid container 1120, liquid type, liquid levels, battery level, error codes, or other information.

Figure 13:
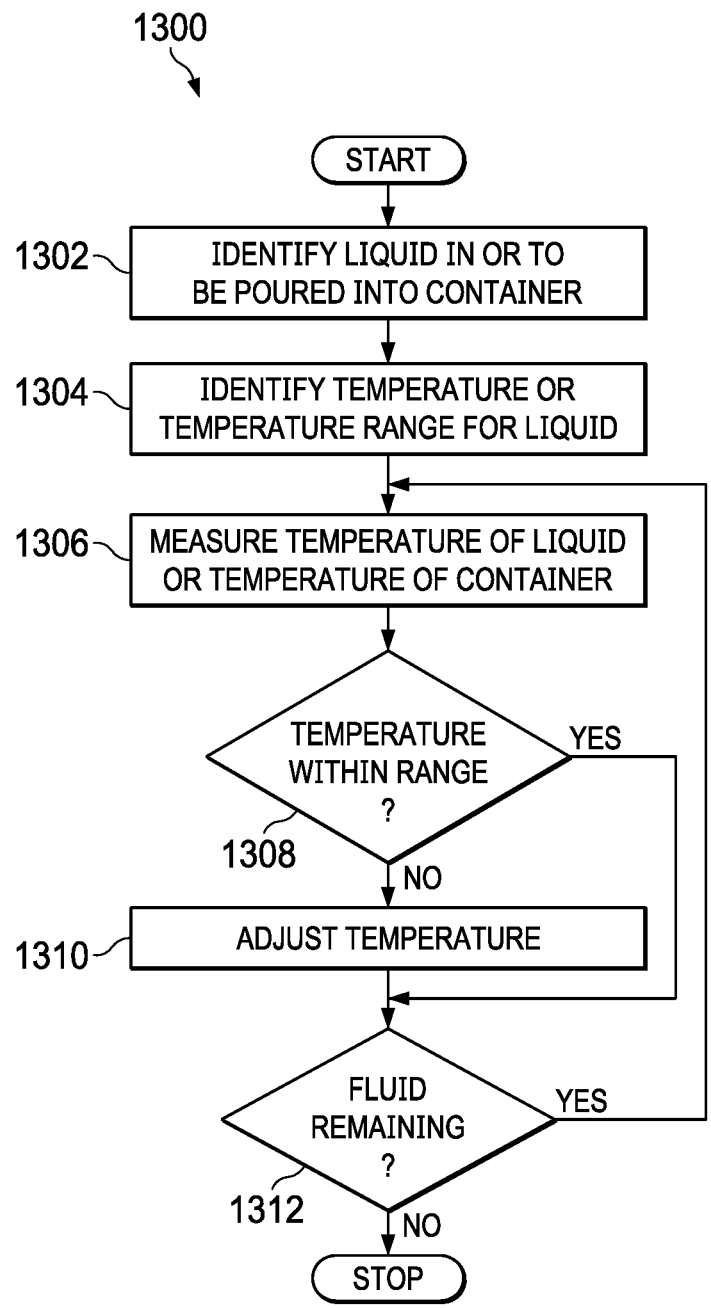
FIG. 13 is a process flow diagram for adjusting the temperature of a liquid in the beverage container in accordance with embodiments of the present disclosure.

FIG. 13 is a process flow diagram 1300 for adjusting the temperature of a liquid in the beverage container in accordance with embodiments of the present disclosure. In some embodiments, a temperature sensor can measure temperature of the liquid or the liquid container, and a temperature adjustment system can be used to alter the temperature of either the liquid or the liquid container so that the liquid is maintained in the liquid container at a desired temperature.

At the outset, the beverage that is in the container or that will be in the container is identified (1302). In some embodiments, the drinker instructs or informs the beverage container of what the beverage is. In some embodiments, the beverage container can use other sensors to determine what the liquid is. The beverage container can identify from memory the temperature for the beverage, can pull the information wirelessly from the internet or other source, or can be manually instructed as to the correct temperature for the beverage (1304).

The temperature sensor can measure the temperature of the liquid or the liquid container (1306). If the liquid or container is already within a range of temperatures considered acceptable (1308), then the beverage container continues to measure temperature in order to maintain the desired temperature until the beverage is finished (1312, 1306). If the beverage or container is not at the desired temperature, then the temperature adjustment system can cool or heat the liquid or the liquid container until the desired temperature is reached (or within an acceptable range) (1310). If fluid is remaining, then the system continues to maintain the temperature; if no fluid is remaining, then the process ends until the next beverage is poured into the container.

The sensor can determine whether there is fluid remaining in the liquid container in different ways. For example, if the temperature of the liquid changes rapidly or to a value well outside the prescribed range, the microcontroller can determine that there is no liquid in the liquid container. (In some embodiments, if there were liquid in the container, a temperature variation extreme enough to suggest that there were no liquid remaining in the liquid container would trigger an error condition and shut down the system.) The sensor can also determine whether there is liquid in the container using optical sensors or other types of sensors: for example, if the clarity or impurity levels change significantly, the sensor data can indicate that the glass is empty. The weight of the glass can also be used.

Figure 14:
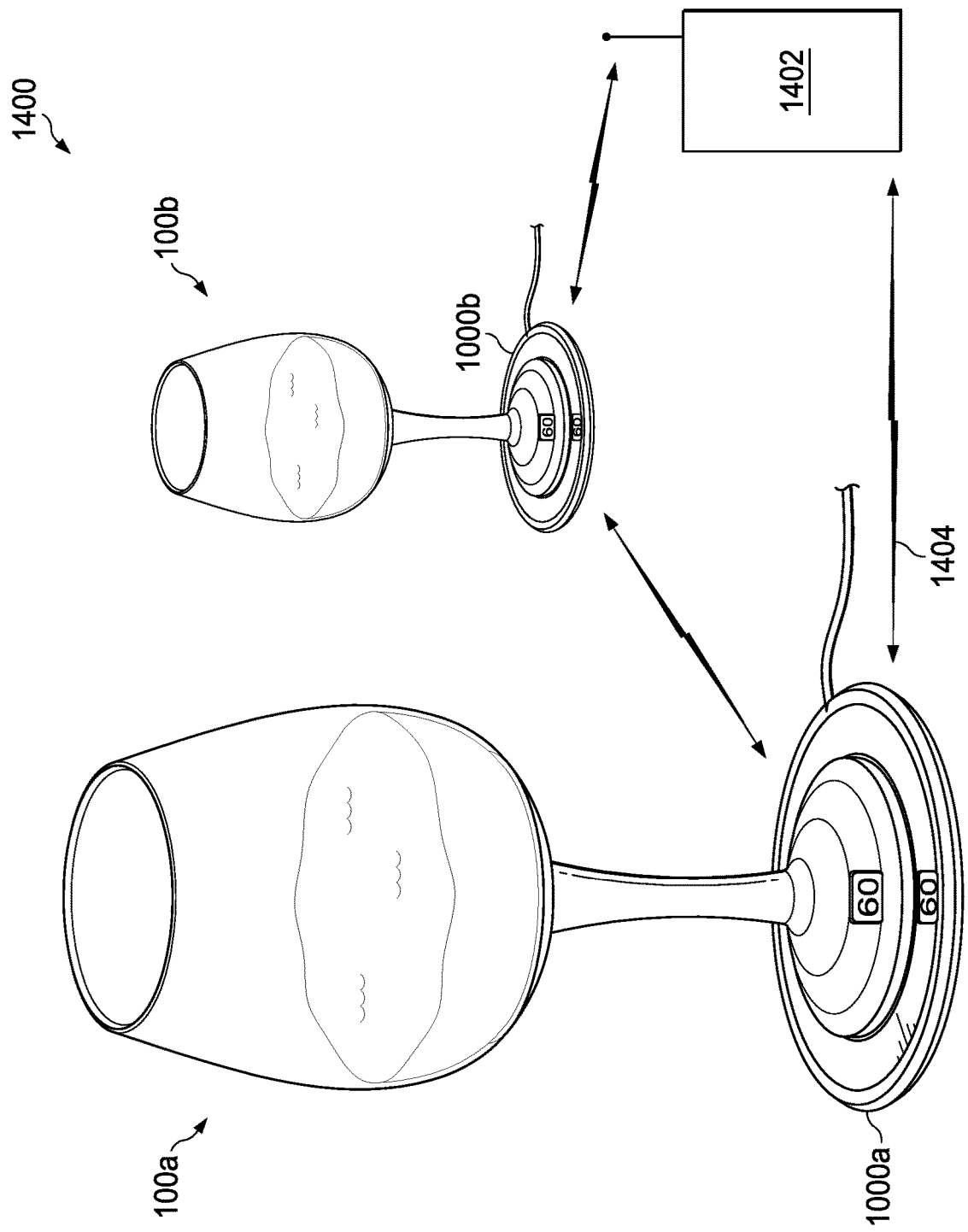
FIG. 14 is a schematic diagram of a beverage container and/or a beverage container charging station receiving information from a device across a wireless interface in accordance with embodiments of the present disclosure.

FIG. 14 is a schematic diagram 1400 of a beverage container and/or a beverage container charging station receiving information from a device across a wireless interface in accordance with embodiments of the present disclosure. A device 1402, such as a wireless communications device, can communicate wirelessly with the beverage container 100a and/or with the charging station/hub 1000a using electromagnetic signals 1404. The device 1402 can send and receive information, instructions, and other data to the beverage container 100a and/or the charging station/hub 1000a. Device 1402 can include a smart phone, tablet computer, personal computer, laptop, desktop, smart hub device (e.g., Echo or Sonos or other device operating a virtual assistant, cloud-based AI, Alexa, Siri, or other AI/operating system), or other wireless communications device. The device 1402 can communicate with one or more charging station/hub 1000a and 1000b and/or with one or more beverage container 100a and 100b.

Electromagnetic signals 1404 can be Bluetooth signals, Wi-Fi signals, RF signals, near-field signals, cellular signals, optical signals, or other types of electromagnetic communication signals. Charging station/hub 1000 can communication beverage containers 100a and 100b to independently program or control the temperatures of the beverage containers using a wireless signal.

Figure 15:
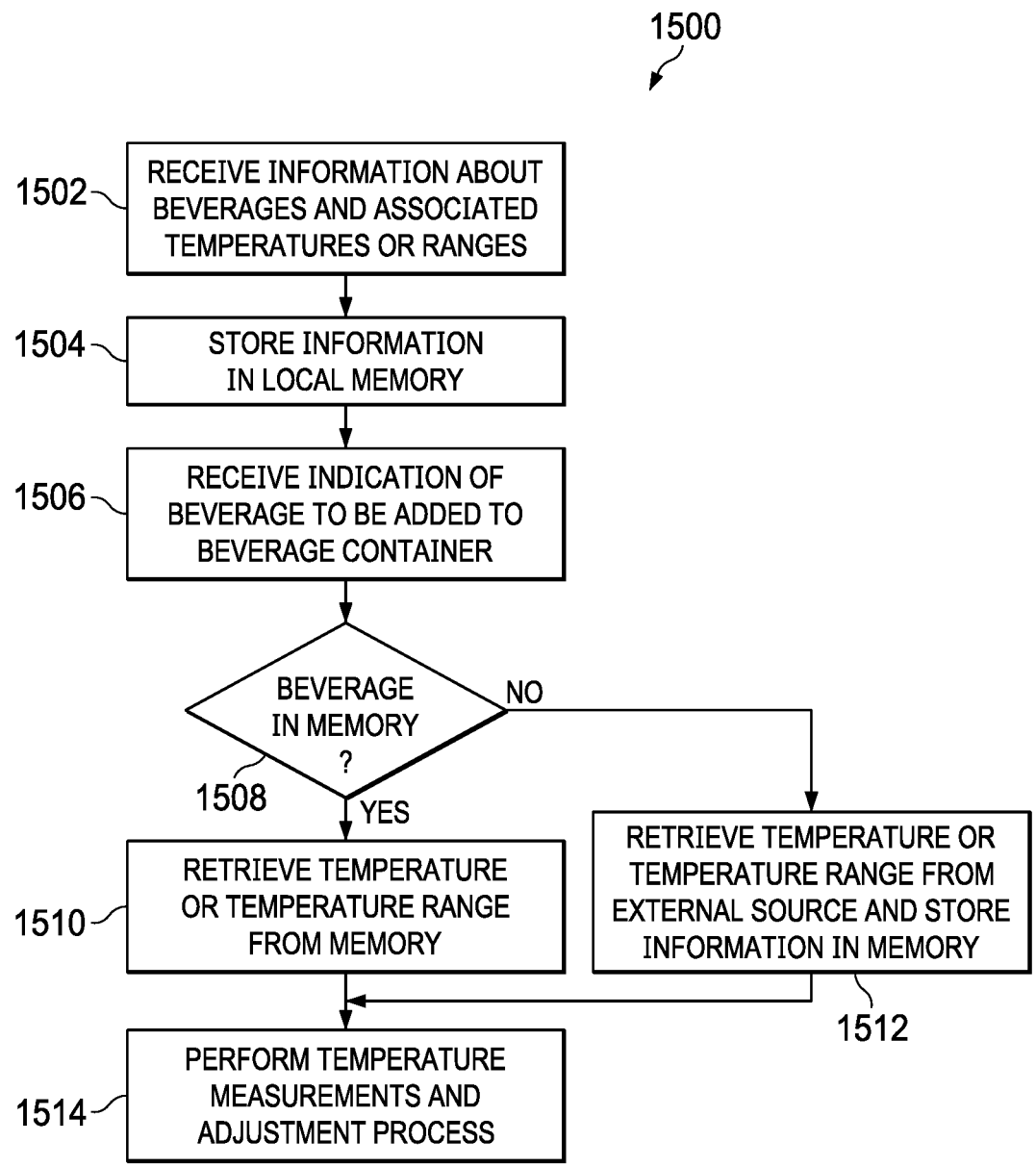
FIG. 15 is a process flow diagram for programming a beverage container or charging station with beverage and temperature information in accordance with embodiments of the present disclosure.

FIG. 15 is a process flow diagram 1500 for programming a beverage container or charging station with beverage and temperature information in accordance with embodiments of the present disclosure. At the outset, the beverage container or the charging station hub can receive information about one or more beverages (1502). The information can pertain to ideal drinking temperatures or temperature ranges, ideal clarity, impurities, expected chemical composition, density, optical properties, or other information. For this example, temperature will be used. The information can be stored in memory (1504). The beverage container or the charging station/hub can receive an indication of a beverage that is to be added to the beverage container (1506).

If the beverage to be added is in the memory (1508), the temperature or temperature range for the beverage can be retrieved from memory (1510). If the beverage to be added is not already in memory, the beverage container or charging station/hub can request and receive that information from an external source (and store the information in memory) (1512). The beverage container can then use the temperature information to control the temperature of the beverage or the liquid container to maintain the liquid at the prescribed temperature (or within the prescribed temperature range) by performing temperature measurements and temperature adjustment processes (1514). For example, a microcontroller or processor can cause a TEC to alter the temperature of the beverage or the liquid container, while a thermometer can measure the temperature of the liquid. As the liquid reaches the desired temperature, the TEC can switch off, but can maintain the temperature using feedback information from the thermometer, thereby maintaining the beverage at the prescribed temperature.

Figure 16:
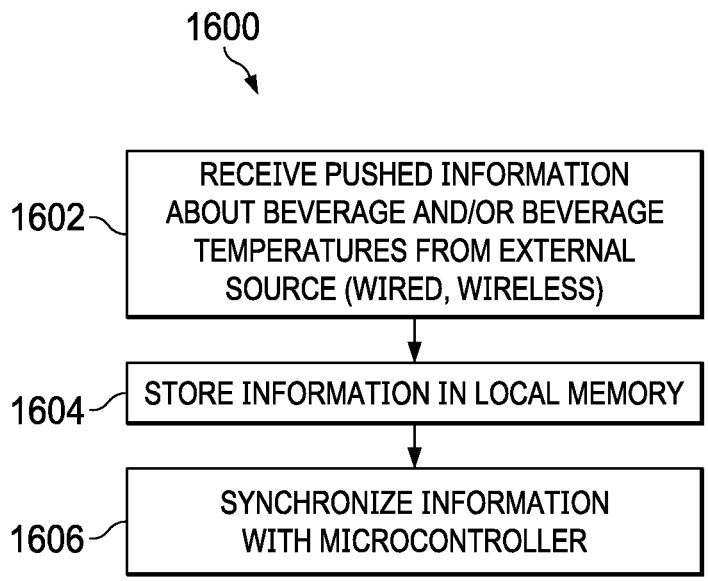
FIG. 16 is a process flow diagram for pushing information to a beverage container or charging station in accordance with embodiments of the present disclosure.

FIG. 16 is a process flow diagram 1600 for pushing information to a beverage container or charging station in accordance with embodiments of the present disclosure. The beverage container and/or the charging station/hub can receive pushed information from an external source, such as a wireless device, connected device, voice command, etc. (1602). The beverage container and/or the charging station/hub can store the information in local memory (1604). The beverage container and/or charging station/hub can then synchronize the information with the microcontroller during operation (1606).

In embodiments, the memory can be used as a database of information, storing beverage information with temperature information and other expected sensor data. The information stored in the database can be used for comparisons or for fast information retrieval in future use cases.

Figure 17:
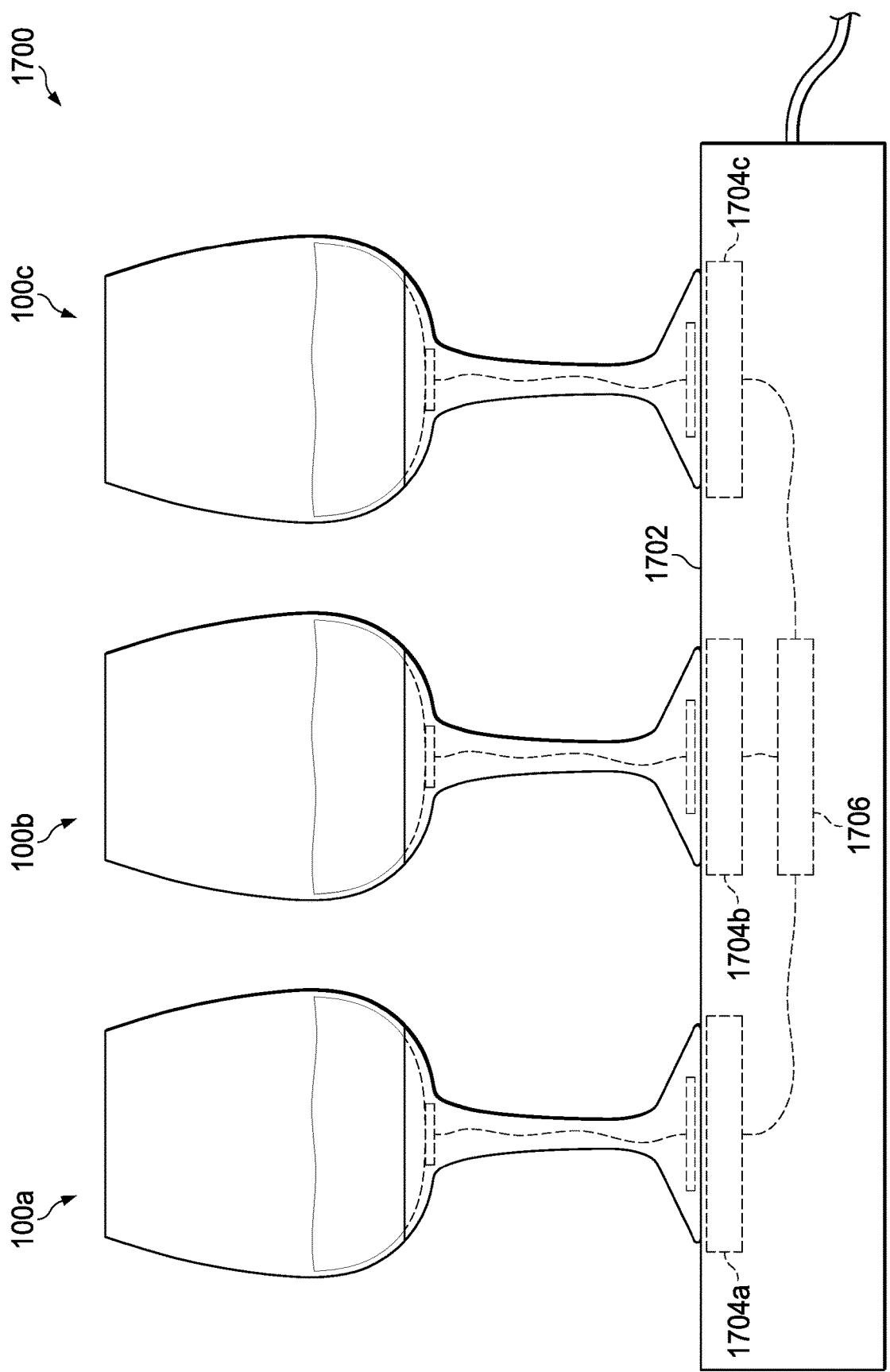
FIG. 17 is a schematic diagram of a charging station that can accommodate multiple beverage containers in accordance with embodiments of the present disclosure.

FIG. 17 is a schematic diagram 1700 of a charging station/hub 1702 that can accommodate multiple beverage containers in accordance with embodiments of the present disclosure. The charging station/hub 1700 can include a plurality of charging pads 1704a-n. In the example shown in FIG. 17, the charging station/hub 1702 includes three charging pads 1704a, 1704b, and 1704c. Each charging pad can support one beverage container 100a, b, and c, respectively. The microcontroller 1706 can control each charging pad independently. For example, if beverage container 100a includes a white wine, the microcontroller 1706 could cause the charging pad 1704a to control the temperature of the beverage container so that the white wine is at the appropriate temperature. At the same time, if beverage container 100b included a full-bodied red white, the microcontroller 1706 could instruct charging pad 1704b to cause the beverage container 100b to maintain the red wine at a different temperature, corresponding to the desired temperature of the red wine.

The charging pads could also provide different power for each beverage container. E.g., there could be a charging pad that will do high power transfer and thus keep glass cooler.

In some embodiments, the charging station/hub 1702 can include integrated base portions that have higher-power cooling or heating capabilities. When a server is ready to pick up the drinks, the cradle portions can be transferred to different stems that are less expensive but still have the capabilities to maintain the desired temperature (or are specifically tailored to the beverage in the liquid container).

Figure 18:
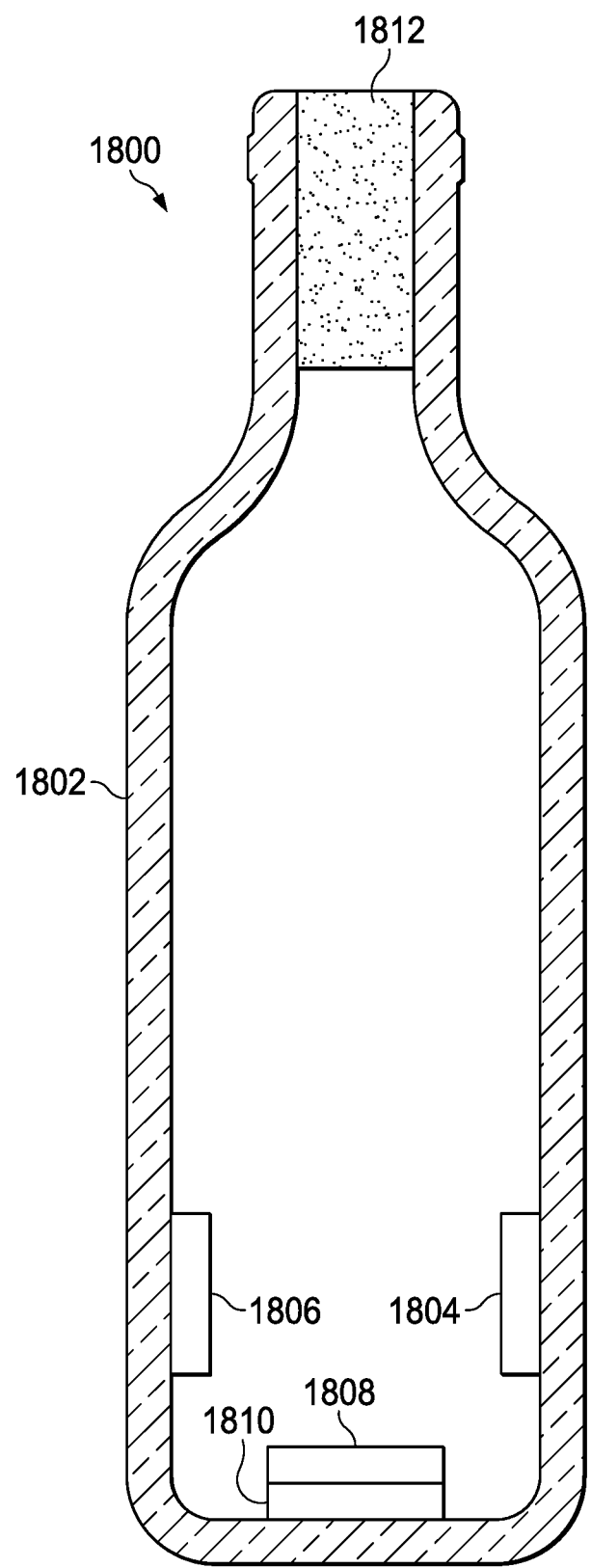
FIG. 18 is schematic diagrams of a bottle that includes an on-board sensor suite in accordance with embodiments of the present disclosure.
Figure 19:
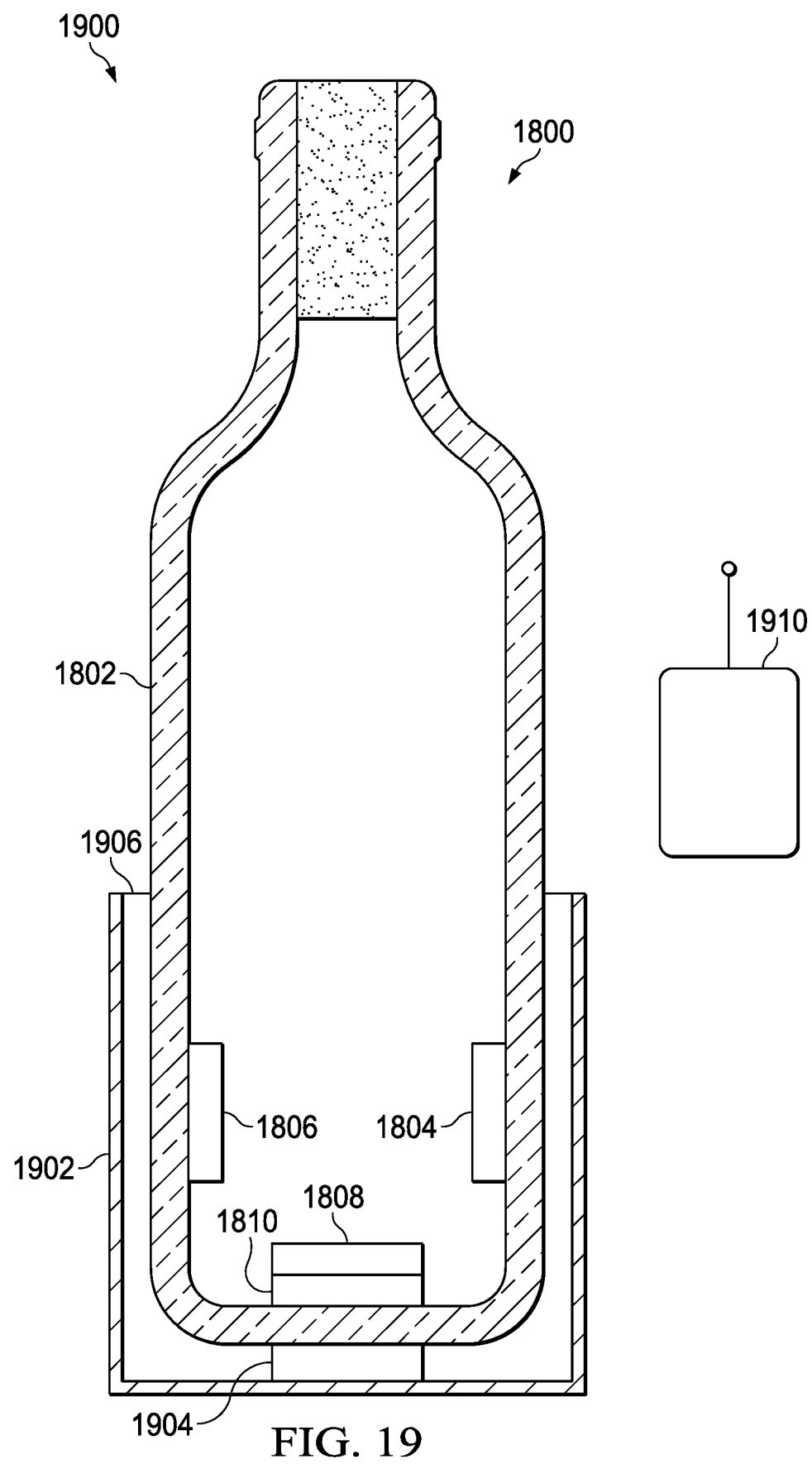
FIG. 19 is a schematic diagram of a device for powering sensors and reading sensor data from a bottle with an on-board sensor suite in accordance with embodiments of the present disclosure.

FIG. 18 is a schematic diagram 1800 of a bottle 1802 that includes an on-board sensor suite 1804 in accordance with embodiments of the present disclosure. FIG. 19 is a schematic diagram 1900 of a device 1902 for powering sensors and reading sensor data from a bottle 1802 in accordance with embodiments of the present disclosure.

In some embodiments, the sensor suites 1804 can be integrated directly into the bottles of wines, liquors, and other beverages. The sensor suite 1804 can include one or more of a temperature sensor, optical sensor, capacitive sensor, chemical sensor, or other type of sensor. The bottles can be modified to include sensor suites 1804, as described herein, as well as the accompanying temperature adjustment mechanisms 1806, electrical circuitry 1808, etc. Electrical circuitry 1808 can include power systems, communication systems, memory, microcontroller/processor, or other electrical components described above.

In some embodiments, the bottle 1802 can include a wireless charger. The use of wireless or inductive charging allows for the bottle to include a pad 1810 that can couple to a pad 1904 on a device 1902. Device 1902 can be a handheld device or a larger device. The device 1902 can include a receiving portion 1906 to receive the bottle 1802 and support the bottle 1802 from tipping over. The device 1902 can include a charging pad 1904 to provide power to sensor suite 1804 and to provide and receive information to/from sensor suite 1804.

In embodiments, the bottle 1802 is corked (with cork or stopper 1812). The sensor suite 1804 allows for the contents of the bottle to be analyzed without uncorking of the bottle 1802. A bottle that is corked can be placed into or onto the device 1902. Using, e.g., an FTIR analysis, the contents of the bottle can be determined. This would allow for the determination whether the contents are genuine (e.g., whether the wine is a fake or fraudulent in some sense) and/or whether the contents are still potable. For example, one of the biggest frauds in wine is taking win from one region that is cheaper and selling with a different label as a more expensive wine. This would allow us to build a database and make sure that some Merlot is not sold as a Cab. Other information can be determined without opening the bottle.

Figure 20:
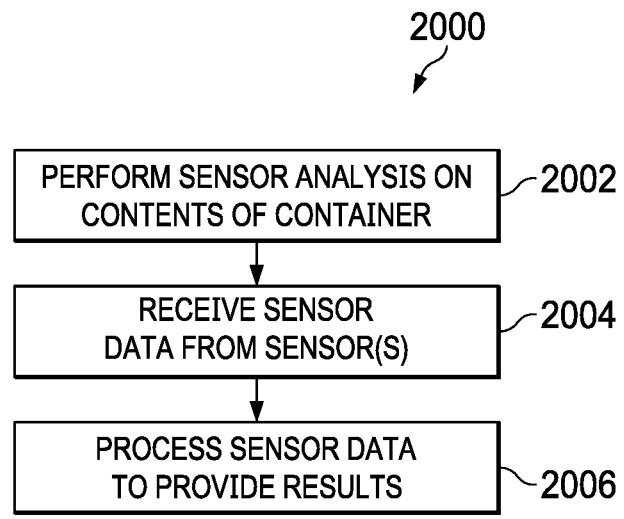
FIG. 20 is a process flow for analyzing contents of a beverage container in accordance with embodiments of the present disclosure.

In embodiments, an accessory 1910 can be used to control the sensor suite 1804, the temperature adjustment mechanisms 1806, or other functionality. Accessory 1910 can also be used to display results from sensor analysis. Accessory 1910 can be a wired or wireless device (e.g., the accessory 1910 can be wired to the device 1902 or can be connected to device 1902 by a wireless connection). The FIG. 20 is a process flow diagram 2000 for analyzing contents of a beverage container in accordance with embodiments of the present disclosure. A sensor can collect information on the contents of the beverage container (e.g., bottle 1802) (2002). The sensor data can be transmitted, wired or wirelessly, to a processor (2004). The processor can output the raw sensor data or can process the raw sensor data to arrive at a conclusion about the sensor data (2006).

As an example, a bottle of wine shipped from a manufacturer can arrive at a distributor. The distributor can use the sensor suite to determine whether the wine inside the bottle is still good or has turned; can identify the impurities in the wine, the type of wine, whether the wine is what the label claims it to be, etc. These determinations can be made using information obtained by the sensor suite and provided to a cradle or accessory for processing, display, etc. all without opening the bottles of wine. In addition, the wine can be kept at a certain temperature throughout the shipping process.

What is claimed is:

1. A drinking vessel comprising:
   a liquid container;
   a temperature sensor to measure a temperature of a liquid within the liquid container;
   one or more sensors configured to determine a type of the liquid in the liquid container;
   a memory for storing predetermined desired temperature ranges corresponding to a plurality of types of liquids; and
   a temperature controller to control the temperature of the liquid in the liquid container to be within a predetermined desired temperature range based on the type of the liquid in the liquid container as determined by the one or more sensors that are configured to determine the type of the liquid in the liquid container and based on a predetermined desired temperature range for the determined type of liquid in the liquid container stored in the memory.

2. The drinking vessel of claim 1, wherein the liquid container comprises an optical sensor positioned to analyze a liquid in the liquid container.

3. The drinking vessel of claim 1, further comprising:
   a memory for storing information about a liquid, the information comprising a predetermined desired temperature range for a plurality of types of liquids;
   a processor for controlling the temperature controller using the information about the liquid stored in the memory; and
   a power source to provide power to the temperature controller.

4. The drinking vessel of claim 3, wherein the drinking vessel comprises a base and wherein the memory, the processor, and the power source are contained in the base.

5. The drinking vessel of claim 4, wherein the liquid container is thermally insulated from the base.

6. The drinking vessel of claim 4, wherein the base comprises a display to display information.

7. The drinking vessel of claim 6, wherein the display is to display temperature information about the liquid in the liquid container.

8. The drinking vessel of claim 4, further comprising a stem coupled to the base.

9. The drinking vessel of claim 8, wherein the stem contains electrical wires connected to the processor.

10. The drinking vessel of claim 8, wherein the liquid container comprises a receiver; wherein the stem comprises a coupling to connect to the receiver; and
    wherein the receiver comprises an electrical interface and the coupling comprises an electrical interface, the receiver and the coupling when connected form an electrical connection.

11. The drinking vessel of claim 3, wherein the information stored in the memory comprises a temperature or a temperature range of a liquid; and
    the processor is to:
    identify a liquid in the liquid container;
    identify a temperature or temperature range for the liquid from the information stored in memory; and
    provide a signal to the temperature controller to cause the temperature controller to maintain the liquid at the temperature or within the temperature range.

12. The drinking vessel of claim 1, wherein the drinking vessel comprises a wine glass.

13. The drinking vessel of claim 1, wherein the temperature controller comprises a thermoelectric cooler.

14. A system comprising:
    a drinking vessel comprising:
    a liquid container comprising:
    a temperature sensor to measure a temperature of a liquid within the liquid container, a sensor suite comprising one or more sensors configured to determine a type of liquid within the liquid container, and a temperature controller to control the temperature of the liquid in the liquid container to be within a predetermined desired temperature range based on the type of the liquid in the liquid container as determined by the one or more sensors that are configured to determine the type of the liquid in the liquid container and based on a predetermined desired temperature range for the determined type of liquid in the liquid container stored in the memory, and a base coupled to the liquid container, the base comprising:

a hardware processor to provide instructions to the temperature controller, a memory to store temperature information for a liquid, a power source to provide power to the processor, memory, and temperature controller, and a wireless charger to charge the power source; and a charging pad to receive the base and to charge the wireless charger.

15. The system of claim 14, wherein the liquid container comprises an optical sensor positioned to analyze a liquid in the liquid container.

16. The system of claim 14, further comprising:
a memory for storing information about a liquid; and
a processor for controlling the temperature controller using the information about the liquid stored in the memory.

17. The system of claim 16, wherein the information stored in the memory comprises a temperature or a temperature range of a liquid; and the processor is to:
identify a liquid in the liquid container;
identify a temperature or temperature range for the liquid from the information stored in memory; and
provide a signal to the temperature controller to cause the temperature controller to maintain the liquid at the temperature or within the temperature range.

18. A method for controlling temperature of a liquid in a liquid container, the method comprising:

identifying, by one or more sensors in the liquid container, a type of liquid within the liquid container;

identifying, from a computer-readable memory, a predetermined ideal drinking temperature range for the liquid based on the determined type of liquid within the liquid container;

determining, using a temperature measurement device in the liquid container, a temperature of the liquid;

determining that the temperature of the liquid is outside of the predetermined ideal drinking temperature range for the liquid; and changing, using a temperature control device, the temperature of the liquid in the liquid container to be within the predetermined ideal drinking temperature range.

19. The method of claim 18, further comprising:
monitoring the temperature of the liquid in the liquid container; and
heating or cooling the liquid to maintain the temperature to be within the range of the ideal drinking temperature.

20. The method of claim 18, further comprising:
receiving an ideal drinking temperature or an ideal drinking temperature range for a liquid from an external source;
storing the ideal drinking temperature or ideal drinking temperature range for the liquid in memory; and
wherein identifying an ideal drinking temperature of the liquid comprises:
retrieving, from memory, the ideal drinking temperature or ideal drinking temperature range.

21. The method of claim 18, wherein identifying a type of liquid within the liquid container comprises:
receiving a signal from an external source identifying the liquid in the liquid container.

22. The method of claim 18, further comprising determining, using a sensor in the liquid container, a level of impurities in the liquid.

23. The method of claim 18, further comprising:
determining that an amount of liquid in the liquid container is less than a predetermined amount; and
sending, by a transceiver, a signal indicating that the amount of liquid in the container is less than a predetermined amount.

* * * * *